United States Patent
Guo et al.

(10) Patent No.: US 10,973,043 B2
(45) Date of Patent: Apr. 6, 2021

(54) COMMUNICATION METHOD, TERMINAL DEVICE, AND NETWORK DEVICE

(71) Applicant: Huawei Technologies Co., Ltd., Shenzhen (CN)

(72) Inventors: Zhiheng Guo, Beijing (CN); Wei Sun, Shenzhen (CN); Xinqian Xie, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 51 days.

(21) Appl. No.: 16/281,621

(22) Filed: Feb. 21, 2019

(65) Prior Publication Data

US 2019/0191450 A1    Jun. 20, 2019

Related U.S. Application Data

(63) Continuation of application No. PCT/CN2017/098011, filed on Aug. 18, 2017.

(30) Foreign Application Priority Data

Aug. 22, 2016   (CN) .......................... 201610703879.5

(51) Int. Cl.
*H04W 72/12*         (2009.01)
*H04L 5/00*          (2006.01)
(Continued)

(52) U.S. Cl.
CPC ....... *H04W 72/1273* (2013.01); *H04L 5/0005* (2013.01); *H04W 72/042* (2013.01);
(Continued)

(58) Field of Classification Search
CPC ............. H04W 72/1273; H04W 72/12; H04W 72/042; H04W 72/0446; H04W 72/0453;
(Continued)

(56) References Cited

U.S. PATENT DOCUMENTS 9,572,148 B2 *  2/2017  Park ...................... H04L 5/0053
9,979,524 B2 *  5/2018  Kim ...................... H04L 5/0051
(Continued)

FOREIGN PATENT DOCUMENTS

CN        103095395 A     5/2013
CN        103986566 A     8/2014
(Continued)

OTHER PUBLICATIONS

ZTE et al., "Multiplexing of eMBB and URLLC", 3GPP TSG RAN WG1 Meeting #86 R1-166408, Aug 22-26, 2016, 10 pages, Gothenburg, Sweden 2016.
(Continued)

*Primary Examiner* — Jay P Patel
(74) *Attorney, Agent, or Firm* — Slater Matsil, LLP

(57) ABSTRACT

A method includes: receiving, by a first terminal device, a first downlink control channel on a third time-frequency resource; and based on the first downlink control channel and on a first time-frequency resource, sending, by the first terminal device, a first uplink message or receiving a first downlink message, where transmission directions of the first uplink message and a second downlink message are different, and the second downlink message is a message that the network device schedules a second terminal device to receive on a second time-frequency resource; transmission directions of the first downlink message and a second uplink message are different, and the second uplink message is a message that the network device schedules the second terminal device to send on the second time-frequency resource; and the first time-frequency resource and the second time-frequency resource include a same time domain resource and a same frequency domain resource.

15 Claims, 11 Drawing Sheets

(51) Int. Cl.
*H04W 72/04* (2009.01)
*H04W 88/02* (2009.01)

(52) U.S. Cl.
CPC ... *H04W 72/0446* (2013.01); *H04W 72/0453* (2013.01); *H04W 72/12* (2013.01); *H04W 88/023* (2013.01)

(58) Field of Classification Search
CPC .. H04W 88/023; H04W 72/048; H04L 5/0005
See application file for complete search history.

(56) References Cited

U.S. PATENT DOCUMENTS

| | | | | |
|---|---|---|---|---|
| 10,098,039 | B1* | 10/2018 | Manchanda | H04W 28/14 |
| 2005/0122904 | A1* | 6/2005 | Kumar | H04L 47/14 |
| | | | | 370/230 |
| 2007/0159969 | A1* | 7/2007 | Das | H04W 72/0413 |
| | | | | 370/229 |
| 2007/0268823 | A1* | 11/2007 | Madison | H04L 47/10 |
| | | | | 370/229 |
| 2010/0296473 | A1* | 11/2010 | Kim | H04L 5/0007 |
| | | | | 370/329 |
| 2012/0134344 | A1* | 5/2012 | Yu | H04W 72/14 |
| | | | | 370/336 |
| 2013/0230032 | A1* | 9/2013 | Lu | H04W 52/16 |
| | | | | 370/336 |
| 2014/0071823 | A1* | 3/2014 | Pannell | H04L 47/50 |
| | | | | 370/230.1 |
| 2014/0178076 | A1* | 6/2014 | Fang | H04Q 11/0071 |
| | | | | 398/98 |
| 2014/0301338 | A1 | 10/2014 | Zhong et al. | |
| 2014/0321423 | A1* | 10/2014 | Kalhan | H04L 5/0053 |
| | | | | 370/330 |
| 2014/0349609 | A1* | 11/2014 | Xu | H04W 74/002 |
| | | | | 455/411 |
| 2015/0003435 | A1* | 1/2015 | Horn | H04W 28/24 |
| | | | | 370/338 |
| 2015/0163842 | A1* | 6/2015 | Kalhan | H04W 84/18 |
| | | | | 455/500 |
| 2015/0181546 | A1* | 6/2015 | Freda | H04L 27/0014 |
| | | | | 370/336 |
| 2015/0289080 | A1* | 10/2015 | Wu | H04W 76/14 |
| | | | | 370/329 |
| 2015/0312905 | A1 | 10/2015 | Seo et al. | |
| 2015/0312943 | A1* | 10/2015 | Zhang | H04W 74/0833 |
| | | | | 370/331 |
| 2016/0095090 | A1* | 3/2016 | Xue | H04J 11/0036 |
| | | | | 370/329 |
| 2016/0112978 | A1* | 4/2016 | Hu | H04W 56/0015 |
| | | | | 370/331 |
| 2016/0323923 | A1* | 11/2016 | Wei | H04L 1/0041 |
| 2016/0338094 | A1* | 11/2016 | Faurie | H04W 72/085 |
| 2016/0338095 | A1* | 11/2016 | Faurie | H04W 28/0278 |
| 2017/0013479 | A1* | 1/2017 | Sun | H04W 24/08 |
| 2017/0026990 | A1 | 1/2017 | Lu et al. | |
| 2017/0181135 | A1* | 6/2017 | Chen | H04L 5/0092 |
| 2017/0290046 | A1* | 10/2017 | Sun | H04W 72/082 |
| 2017/0311337 | A1* | 10/2017 | Mo | H04L 1/1893 |
| 2017/0366308 | A1* | 12/2017 | Choi | H04W 72/14 |
| 2018/0048422 | A1* | 2/2018 | Park | H04L 1/00 |
| 2018/0084497 | A1* | 3/2018 | Jung | H04W 52/0225 |
| 2018/0167980 | A1* | 6/2018 | Shi | H04L 1/00 |
| 2018/0255576 | A1* | 9/2018 | Bhorkar | H04W 74/0808 |
| 2018/0270854 | A1* | 9/2018 | Lee | H04L 1/1896 |
| 2018/0310335 | A1* | 10/2018 | Tang | H04W 72/0413 |

FOREIGN PATENT DOCUMENTS

| | | |
|---|---|---|
| CN | 105794291 A | 7/2016 |
| EP | 3086621 A1 | 10/2016 |
| WO | 2015120577 A1 | 8/2015 |
| WO | 2015179136 A1 | 11/2015 |

OTHER PUBLICATIONS

LG Electronics, "Handling URLLC in new RAT", 3GPP TSG RAN WG1 Meeting #86 R1-166886, Aug 22-26, 2016, 5 pages, Gothenburg, Sweden.
NTT Docomo, Inc., "On co-existence of eMBB and URLLC", 3GPP TSG RAN WG1 Meeting #86 R1-167391, Aug. 22-26, 2016, 5 pages, Gothenburg, Sweden.
Intel Corporation, "Discussion on multiplexing of eMBB and URLLC", 3GPP TSG RAN1 WG Meeting #86 R1-167708, Aug. 22-26, 2016, 5 pages, Gothenburg, Sweden.

\* cited by examiner

COMMUNICATION METHOD, TERMINAL DEVICE, AND NETWORK DEVICE

CROSS-REFERENCE TO RELATED APPLICATIONS

This application is a continuation of International Application No. PCT/CN2017/098011, filed on Aug. 18, 2017, which claims priority to Chinese Patent Application No. 201610703879.5, filed on Aug. 22, 2016. The disclosures of the aforementioned applications are hereby incorporated by reference in their entireties.

TECHNICAL FIELD

This application relates to communications technologies, and in particular, to a communication method, a terminal device, and a network device.

BACKGROUND

Currently, based on a requirement of the International Telecommunication Union (ITU) on a future communications system, an air interface in the future communications system needs to support various services such as an enhanced mobile broadband (eMBB) service, an ultra-reliable and low latency communications (URLLC) service, and a massive machine type communications (Massive MTC) service.

The different services have different requirements on a communications system. Some services have a relatively high latency requirement, and some services have a relatively low latency requirement. In an LTE communications system, a network device may send a downlink control channel to a terminal device, to schedule the terminal device to send an uplink message for a current service on the terminal device or receive a downlink message for a current service on the terminal device on a time-frequency resource indicated by the downlink control channel.

However, how the network device schedules, after scheduling a terminal device whose current service has a relatively low latency requirement to send or receive a message, a terminal device whose current service has a relatively high latency requirement to send or receive a message is a problem that needs to be urgently resolved.

SUMMARY

This application provides a communication method, a terminal device, and a network device, to resolve a technical problem of how a network device schedules, after scheduling a terminal device whose current service has a relatively low latency requirement to send or receive a message, a terminal device whose current service has a relatively high latency requirement to send or receive a message, to meet a latency requirement of the terminal device whose current service has a relatively high latency requirement.

According to a first aspect, this application provides a communication method. The method includes receiving, by a first terminal device, a first downlink control channel that is sent by a network device on a third time-frequency resource. The method also includes sending, by the first terminal device, a first uplink message to the network device on a first time-frequency resource based on the first downlink control channel, where transmission directions of the first uplink message and a second downlink message are different, and the second downlink message is a message that is sent by the network device and that the network device schedules, by using a second downlink control channel, a second terminal device to receive on a second time-frequency resource; or receiving, by the first terminal device based on the first downlink control channel and on the first time-frequency resource, a first downlink message sent by the network device, where transmission directions of the first downlink message and a second uplink message are different, and the second uplink message is a message that the network device schedules, by using the second downlink control channel, the second terminal device to send to the network device on the second time-frequency resource, where the first time-frequency resource and the second time-frequency resource include a same time domain resource and a same frequency domain resource.

In the communication method provided in the first aspect, after the network device schedules, by using the second downlink control channel, the second terminal device whose current service has a relatively low latency requirement to send the second uplink message to the network device on the second time-frequency resource or receive, on the second time-frequency resource, the second downlink message sent by the network device, if the network device needs to urgently schedule transmission of the first terminal device whose current service has a high latency requirement, to meet the latency requirement of the current service on the first terminal device, the network device may interrupt transmission of the second terminal device, and allocate, to the first terminal device as a part or all of the first time-frequency resource, some or all time-frequency resources of the time-frequency resource used by the second terminal to send the second uplink message to the network device, so that the first terminal device can use the first time-frequency resource to receive the first downlink message sent by the network device, or allocate, to the first terminal device as a part or all of the first time-frequency resource, some or all time-frequency resources of the time-frequency resource used by the second terminal to receive the second downlink message sent by the network device, so that the first terminal device can use the first time-frequency resource to send the first uplink message to the network device. In this way, the first terminal device can use the first time-frequency resource to perform transmission without waiting for completion of transmission of the second terminal device, thereby shortening a transmission latency of the first terminal device, and meeting the latency requirement of the current service on the first terminal device.

Optionally, in a possible implementation of the first aspect, before the receiving, by a first terminal device, a first downlink control channel that is sent by a network device on a third time-frequency resource, the method further includes: receiving, by the first terminal device, indication information sent by the network device; and determining, by the first terminal device based on the indication information, to receive the first downlink control channel.

In the communication method provided in this possible implementation, in addition to shortening the transmission latency of the first terminal device, and meeting the latency requirement of the current service on the first terminal device, the network device sends, to the terminal device, the indication information used to indicate whether the network device is to send the first downlink control channel, so that the first terminal device can determine, based on the indication information, where to listen to the first downlink control channel, to ensure that the first terminal device can successfully receive the first downlink control channel, thereby reducing blind detections on the first downlink control channel by the first terminal device, reducing blind detection complexity, and reducing power consumption of the first terminal device.

Optionally, in a possible implementation of the first aspect, the indication information further includes information about the third time-frequency resource, and the determining, by the first terminal device based on the indication information, to receive the first downlink control channel includes: determining, by the first terminal device based on the indication information, to receive the first downlink control channel on the third time-frequency resource.

In the communication method provided in this possible implementation, the indication information carries the information about the third time-frequency resource used for sending the first downlink control channel, so that the first terminal device can directly listen to the first downlink control channel on a third time-frequency resource based on the indication information, to ensure that the first terminal device can successfully receive the first downlink control channel, thereby reducing blind detections on the first downlink control channel by the first terminal device, reducing blind detection complexity, and reducing power consumption of the first terminal device.

Optionally, in a possible implementation of the first aspect, the indication information further includes a time-frequency resource range for receiving the first downlink control channel, the time-frequency resource range includes the third time-frequency resource, and the determining, by the first terminal device based on the indication information, to receive the first downlink control channel includes: determining, by the first terminal device based on the indication information, to receive the first downlink control channel on a time-frequency resource in the time-frequency resource range.

In the communication method provided in this possible implementation, the indication information carries the time-frequency resource range for receiving the first downlink control channel, so that the first terminal device can listen to the first downlink control channel in the time-frequency resource range based on the indication information, to ensure that the first terminal device can successfully receive the first downlink control channel, thereby reducing blind detections on the first downlink control channel by the first terminal device, reducing blind detection complexity, and reducing power consumption of the first terminal device.

Optionally, in a possible implementation of the first aspect, the determining, by the first terminal device based on the indication information, to receive the first downlink control channel includes: determining, by the first terminal device based on the indication information, to receive the first downlink control channel on the preset third time-frequency resource.

According to a second aspect, this application provides a communication method. The method includes sending, by a network device, a first downlink control channel to a first terminal device on a third time-frequency resource. The first downlink control channel is used to instruct the first terminal device to send a first uplink message to the network device on a first time-frequency resource, transmission directions of the first uplink message and a second downlink message are different, and the second downlink message is a message that is sent by the network device and that the network device schedules, by using a second downlink control channel, a second terminal device to receive on a second time-frequency resource; or the first downlink control channel is used to instruct the first terminal device to receive, on the first time-frequency resource, a first downlink message sent by the network device, transmission directions of the first downlink message and a second uplink message are different, and the second uplink message is a message that the network device schedules, by using the second downlink control channel, the second terminal device to send to the network device on the second time-frequency resource. The method also includes receiving, by the network device on the first time-frequency resource, the first uplink message sent by the first terminal device, and skipping sending the second downlink message to the second terminal device on a same time domain resource that is in the second time-frequency resource and the first time-frequency resource; or sending the first downlink message to the first terminal device on the first time-frequency resource, and skipping receiving, on the same time domain resource that is in the second time-frequency resource and the first time-frequency resource, the second uplink message sent by the second terminal device, where the first time-frequency resource and the second time-frequency resource include a same time domain resource and a same frequency domain resource.

Optionally, in a possible implementation of the second aspect, before the sending, by a network device, a first downlink control channel to a first terminal device on a third time-frequency resource, the method further includes: sending, by the network device, indication information to the first terminal device, where the indication information is used to indicate, to the first terminal device, whether the network device is to send the first downlink control channel.

Optionally, in a possible implementation of the second aspect, the indication information further includes information about the third time-frequency resource.

Optionally, in a possible implementation of the second aspect, the indication information further includes a time-frequency resource range for receiving the first downlink control channel, and the time-frequency resource range includes the third time-frequency resource.

Optionally, in a possible implementation of the second aspect, the indication information is used to indicate, to the first terminal device, whether the network device is to send the first downlink control channel on the preset third time-frequency resource.

For beneficial effects of the communication method provided in the second aspect and the possible implementations of the second aspect, refer to the beneficial effects brought by the first aspect and the possible implementations of the first aspect. Details are not described herein again.

According to a third aspect, this application provides a terminal device. The terminal device is a first terminal device, and the first terminal device includes: a receiving module, configured to receive a first downlink control channel that is sent by a network device on a third time-frequency resource. The terminal device also includes a processing module, configured to control, based on the first downlink control channel, a sending module to send a first uplink message to the network device on a first time-frequency resource, where transmission directions of the first uplink message and a second downlink message are different, and the second downlink message is a message that is sent by the network device and that the network device schedules, by using a second downlink control channel, a second terminal device to receive on a second time-frequency resource; or control, based on the first downlink control channel, the receiving module to receive, on the first time-frequency resource, a first downlink message sent by the network device, where transmission directions of the first downlink message and a second uplink message are different, and the second uplink message is a message that the network device schedules, by using the second downlink control channel, the second terminal device to send to the network device on the second time-frequency resource, where the first time-frequency resource and the second time-frequency resource include a same time domain resource and a same frequency domain resource.

Optionally, in a possible implementation of the third aspect, the receiving module is further configured to: before receiving the first downlink control channel that is sent by the network device on the third time-frequency resource, receive indication information sent by the network device; and the processing module is further configured to determine, based on the indication information, to control the receiving module to receive the first downlink control channel.

Optionally, in a possible implementation of the third aspect, the indication information further includes information about the third time-frequency resource, and the processing module is specifically configured to determine, based on the indication information, to control the receiving module to receive the first downlink control channel on the third time-frequency resource.

Optionally, in a possible implementation of the third aspect, the indication information further includes a time-frequency resource range for receiving the first downlink control channel, and the time-frequency resource range includes the third time-frequency resource, and the processing module is specifically configured to determine, based on the indication information, to control the receiving module to receive the first downlink control channel on a time-frequency resource in the time-frequency resource range.

Optionally, in a possible implementation of the third aspect, the processing module is specifically configured to determine, based on the indication information, to control the receiving module to receive the first downlink control channel on the preset third time-frequency resource.

For beneficial effects of the terminal device provided in the third aspect and the possible implementations of the third aspect, refer to the beneficial effects brought by the first aspect and the possible implementations of the first aspect. Details are not described herein again.

According to a fourth aspect, this application provides a network device. The network device includes: a sending module, configured to send a first downlink control channel to a first terminal device on a third time-frequency resource, where the first downlink control channel is used to instruct the first terminal device to send a first uplink message to the network device on a first time-frequency resource, transmission directions of the first uplink message and a second downlink message are different, and the second downlink message is a message that is sent by the network device and that the network device schedules, by using a second downlink control channel, a second terminal device to receive on a second time-frequency resource; or the first downlink control channel is used to instruct the first terminal device to receive, on the first time-frequency resource, a first downlink message sent by the network device, transmission directions of the first downlink message and a second uplink message are different, and the second uplink message is a message that the network device schedules, by using the second downlink control channel, the second terminal device to send to the network device on the second time-frequency resource. The network device also includes a processing module, configured to control a receiving module to receive, on the first time-frequency resource, the first uplink message sent by the first terminal device, and control the sending module not to send the second downlink message to the second terminal device on a same time domain resource that is in the second time-frequency resource and the first time-frequency resource; or control the sending module to send the first downlink message to the first terminal device on the first time-frequency resource, and control the receiving module not to receive, on the same time domain resource that is in the second time-frequency resource and the first time-frequency resource, the second uplink message sent by the second terminal device, where the first time-frequency resource and the second time-frequency resource include a same time domain resource and a same frequency domain resource.

Optionally, in a possible implementation of the fourth aspect, the sending module is further configured to: before sending the first downlink control channel to the first terminal device on the third time-frequency resource, send indication information to the first terminal device, where the indication information is used to indicate, to the first terminal device, whether the network device is to send the first downlink control channel.

Optionally, in a possible implementation of the fourth aspect, the indication information further includes information about the third time-frequency resource.

Optionally, in a possible implementation of the fourth aspect, the indication information further includes a time-frequency resource range for receiving the first downlink control channel, and the time-frequency resource range includes the third time-frequency resource.

Optionally, in a possible implementation of the fourth aspect, the indication information is used to indicate, to the first terminal device, whether the network device is to send the first downlink control channel on the preset third time-frequency resource.

For beneficial effects of the network device provided in the fourth aspect and the possible implementations of the fourth aspect, refer to the beneficial effects brought by the first aspect and the possible implementations of the first aspect. Details are not described herein again.

With reference to the first aspect and the possible implementations of the first aspect, the second aspect and the possible implementations of the second aspect, the third aspect and the possible implementations of the third aspect, and the fourth aspect and the possible implementations of the fourth aspect, the third time-frequency resource and the second time-frequency resource include a same time domain resource and/or a same frequency domain resource.

With reference to the first aspect and the possible implementations of the first aspect, the second aspect and the possible implementations of the second aspect, the third aspect and the possible implementations of the third aspect, and the fourth aspect and the possible implementations of the fourth aspect, the first uplink message includes a first uplink data channel, and the first downlink message includes a first downlink data channel.

With reference to the first aspect and the possible implementations of the first aspect, the second aspect and the possible implementations of the second aspect, the third aspect and the possible implementations of the third aspect, and the fourth aspect and the possible implementations of the fourth aspect, the first uplink message includes a feedback signal of a first downlink data channel; and the first downlink control channel is further used to schedule the first terminal device to receive, on a fourth time-frequency resource, a third downlink message sent by the network device, where the third downlink message includes the first downlink data channel, transmission directions of the third downlink message and the second downlink message are the same, the fourth time-frequency resource and the second time-frequency resource include a same time domain resource and/or a same frequency domain resource, and a time domain resource of the fourth time-frequency resource is earlier than a time domain resource of the first time-frequency resource.

A fifth aspect of this application provides a terminal device. The terminal device is a first terminal device, and the first terminal device includes a processor and a memory. The memory is configured to store a program, and the processor invokes the program stored in the memory, to perform the method provided in the first aspect of this application.

A sixth aspect of this application provides a network device. The network device includes a processor and a memory. The memory is configured to store a program, and the processor invokes the program stored in the memory, to perform the method provided in the second aspect of this application.

A seventh aspect of this application provides a readable storage medium. The readable storage medium stores a program, and when the program is executed, steps of methods provided in the first aspect and the second aspect of this application are performed.

An eighth aspect of this application provides a communications apparatus, including: hardware related to a program instruction, where the hardware is configured to perform steps of methods provided in the first aspect and the second aspect of this application.

According to the communication method, the terminal device, and the network device provided in this application, after the network device schedules, by using the second downlink control channel, the second terminal device whose current service has a relatively low latency requirement to send the second uplink message to the network device on the second time-frequency resource or receive, on the second time-frequency resource, the second downlink message sent by the network device, if the network device needs to urgently schedule transmission of the first terminal device whose current service has a high latency requirement, to meet the latency requirement of the current service on the first terminal device, the network device may interrupt transmission of the second terminal device, and allocate, to the first terminal device as a part or all of the first time-frequency resource, some or all time-frequency resources of the time-frequency resource used by the second terminal to send the second uplink message to the network device, so that the first terminal device can use the first time-frequency resource to receive the first downlink message sent by the network device, or allocate, to the first terminal device as a part or all of the first time-frequency resource, some or all time-frequency resources of the time-frequency resource used by the second terminal to receive the second downlink message sent by the network device, so that the first terminal device can use the first time-frequency resource to send the first uplink message to the network device. In this way, the first terminal device can use the first time-frequency resource to perform transmission without waiting for completion of transmission of the second terminal device, thereby shortening a transmission latency of the first terminal device, and meeting the latency requirement of the current service on the first terminal device.

DETAILED DESCRIPTION OF ILLUSTRATIVE EMBODIMENTS

Figure 1:
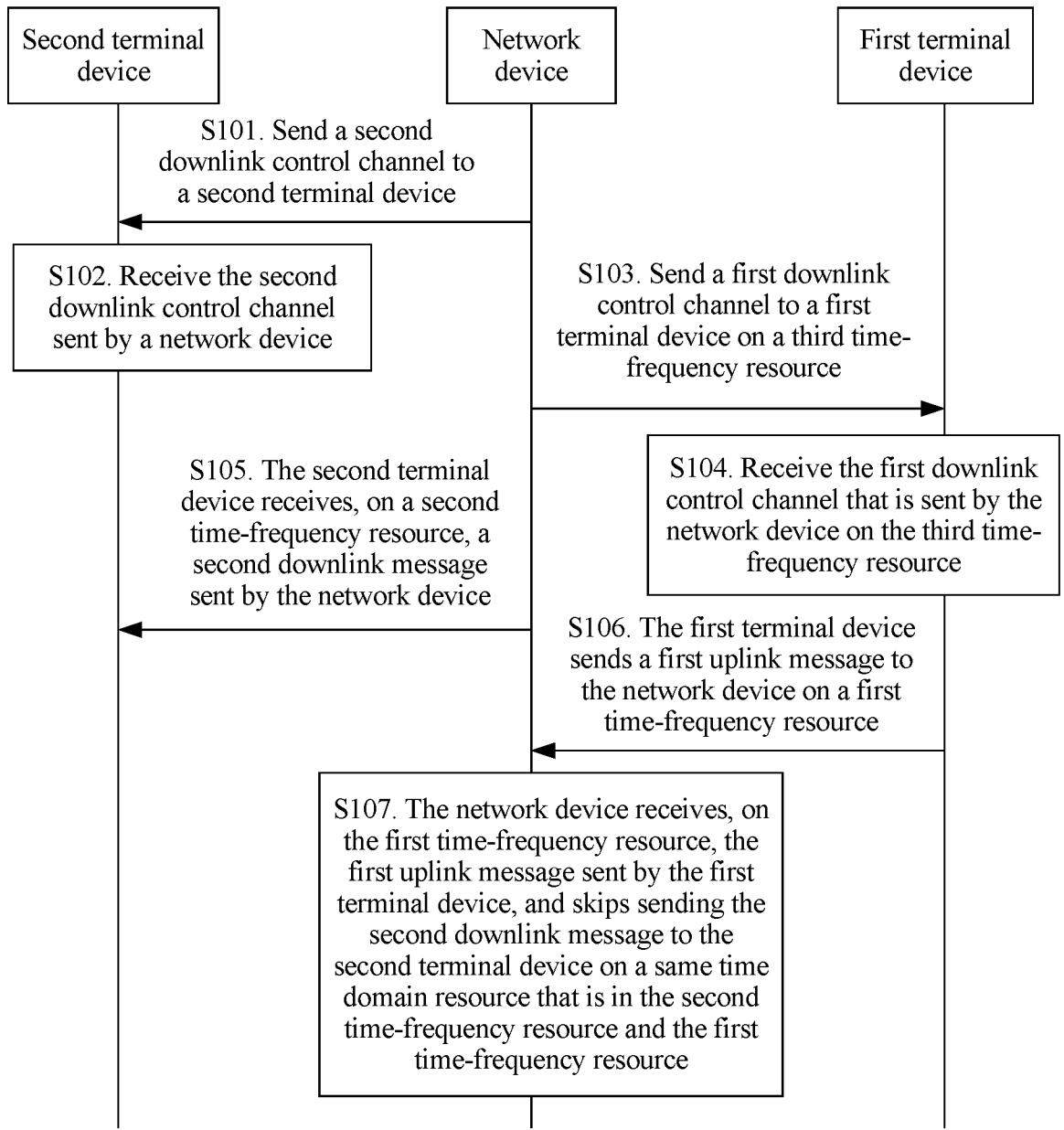
FIG. 1 is a signaling flowchart of a communication method according to this application.

A terminal device in this application may be a device that provides a user with voice and/or data connectivity, a handheld device with a wireless connection function, or another processing device connected to a wireless modem. A wireless terminal may communicate with one or more core networks by using a radio access network (RAN). The wireless terminal may be a mobile terminal such as a mobile phone (or referred to as a "cellular" phone) and a computer with a mobile terminal, for example, may be a portable, pocket-sized, handheld, computer built-in, or in-vehicle mobile apparatus, which exchanges a voice and/or data with the radio access network. For example, the wireless terminal may be a device such as a personal communication service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile, a remote station, an access point, a remote terminal, an access terminal, a user terminal, a user agent, a user device, or user equipment.

A network device in this application may be a base station or an access point, or may be a device that communicates with a wireless terminal device by using one or more sectors on an air interface in an access network. The base station may be configured to mutually convert a received over-the-air frame and IP packet as a router between the wireless terminal and a rest portion of the access network, and the rest portion of the access network may include an Internet Protocol (IP) network. The base station may further coordinate attribute management on the air interface. For example, the base station may be a base transceiver station (BTS) in GSM or CDMA, or may be a NodeB in WCDMA, or may be an evolved NodeB (eNB or e-NodeB) in LTE. This is not limited in this application.

A communication method provided in this application is applicable to a terminal device with a relatively high message sending or message receiving latency requirement and a network device scheduling the terminal device to send a message or receive a message that are in any wireless communications system. The wireless communications system herein may be, for example, an LTE communications system, a 4G communications system, or a 5G communications system.

The LTE communications system is used as an example. After a network device in the LTE communications system schedules, by using a downlink control channel, a terminal device 1 whose current service has a relatively low latency requirement to send an uplink message to the network device on a time-frequency resource 1 or receive, on the time-frequency resource 1, a downlink message sent by the network device, if the network device needs to further schedule a terminal device 2 to send an uplink message to the network device or receive a downlink message sent by the network device, the network device can schedule, only by using a next downlink control channel, the terminal device 2 to use a time-frequency resource later than the "time-frequency resource 1 scheduled by the network device for the terminal device 1" to send the uplink message to the network device or receive the downlink message sent by the network device. In this case, if a current service on the terminal device 2 has a relatively high latency requirement, when the terminal device 2 sends the uplink message or receives the downlink message based on the time-frequency resource scheduled by the network device for the terminal device 2, or in other words, when the terminal device 2 receives the downlink message or sends the uplink message after the terminal device 1 sends the uplink message or receives the downlink message, a latency requirement of the current service on the terminal device 2 cannot be met because of a relatively high latency of the current service on the terminal device 2. The service having a high latency requirement may be, for example, URLLC. The service having a low latency requirement may be, for example, eMBB.

The communication method provided in this application is intended to resolve a technical problem of how a network device schedules, after scheduling a terminal device whose current service has a relatively low latency requirement to send or receive a message, a terminal device whose current service has a relatively high latency requirement to send or receive a message, to meet a latency requirement of the terminal device whose current service has a relatively high latency requirement.

The following describes technical solutions of this application in detail by using specific embodiments. The following specific embodiments may be mutually combined, and same or similar concepts or processes may not be repeatedly described in some embodiments.

FIG. 1 is a signaling flowchart of a communication method according to this application. This embodiment includes a first terminal device and a second terminal device. A latency requirement of a current service on the first terminal device is higher than a latency requirement of a current service on the second terminal device. Embodiment 1 is related to a specific process in which after scheduling, by using a second downlink control channel, the second terminal device to send a second uplink message to the network device on a second time-frequency resource or receive, on the second time-frequency resource, a second downlink message sent by the network device, a network device schedules the first terminal device to receive, on a first time-frequency resource that includes a same time domain resource and a same frequency domain resource as the second time-frequency resource, a first downlink message sent by the network device or send a first uplink message to the network device on the first time-frequency resource. As shown in FIG. 1, the method includes the following steps.

S101. The network device sends the second downlink control channel to the second terminal device.

Specifically, in this embodiment, the network device may schedule, by sending the second downlink control channel to the second terminal device, the second terminal device to send the second uplink message to the network device on the second time-frequency resource indicated by the second downlink control channel, or receive, on the second time-frequency resource, the second downlink message sent by the network device. The second uplink message herein may be, for example, a second uplink data channel that is to be sent by the second terminal device to the network device, or may be a feedback signal of a second downlink data channel that is sent by the network device and that is received by the second terminal device before the second time-frequency resource. The feedback signal may be, for example, an acknowledgment (ACK) signal or a negative acknowledgment (NACK) signal. The acknowledgment signal is used to indicate, to the network device, that the second terminal device has correctly received the second downlink data channel. The negative acknowledgment signal is used to indicate, to the network device, that the second terminal device fails to correctly receive the second downlink data channel. The second downlink message herein may be, for example, a second downlink data channel that is sent by the network device and that is to be received by the second terminal device. During specific implementation, whether the network device schedules, by using the second downlink control channel, the second terminal device to send the second uplink message or receive the second downlink message may be specifically determined based on a requirement of the current service on the second terminal device. This is not described in detail in this application.

The second time-frequency resource scheduled by the network device for the second terminal device may include a consecutive time domain resource and a frequency domain resource that occupies a specific width on the consecutive time domain resource. The frequency domain resource may occupy a same width on the consecutive time domain resource, or occupy different widths at different time domain locations, or the like. Optionally, the second time-frequency resource scheduled by the network device for the second terminal device may alternatively include an inconsecutive time domain resource and a frequency domain resource that occupies a specific width on the inconsecutive time domain resource. The frequency domain resource may occupy a same width on the inconsecutive time domain resource, or occupy different widths at different time domain locations, or the like. During specific implementation, the network device may determine the second time-frequency resource with reference to a current available resource of a system and a size of the second uplink message to be sent by the second terminal device or the second downlink message to be received by the second terminal device. For example, the second time-frequency resource may be one or more subframes, may be one or more symbols, may be one or more transmission time intervals (TTI), or may be a transmission time unit (TTU).

It should be noted that, a manner in which the network device sends the second downlink control channel to the second terminal device is not limited in this embodiment. For example, the network device may send the second downlink control channel to the second terminal device by using a time-frequency resource that is agreed on with the second terminal device, or may send the second downlink control channel to the second terminal device in a prior-art manner for sending a downlink control channel. This is not described in detail.

S102. The second terminal device receives the second downlink control channel sent by the network device.

Specifically, if the network device may send the second downlink control channel to the second terminal device by using the time-frequency resource that is agreed on with the second terminal device, the second terminal device may directly receive, on the time-frequency resource agreed on between the two parties, the second downlink control channel sent by the network device. If the network device sends the second downlink control channel to the second terminal device in the prior-art manner for sending a downlink control channel, the second terminal device may receive, in an existing manner for receiving a downlink control channel, the second downlink control channel sent by the network device. This is not described in detail in this application.

S103. The network device sends a first downlink control channel to the first terminal device on a third time-frequency resource.

Specifically, in this embodiment, the latency requirement of the current service on the first terminal device is higher than the latency requirement of the current service on the second terminal device. During specific implementation, the network device may determine, based on the current service corresponding to the second terminal device, the current service corresponding to the first terminal device, and a preset mapping relationship between a service and a latency level, that the latency requirement of the current service on the first terminal device is higher than the latency requirement of the current service on the second terminal device.

In this way, when the network device sends the second downlink control channel to the second terminal device to schedule the second terminal device to send the second uplink message to the network device on the second time-frequency resource, and time domain resource duration of the second time-frequency resource has not ended, if the network device determines to send the first downlink message to the first terminal device, the network device may interrupt communication of the second terminal device whose latency requirement of the current service is lower than that of the first terminal device, and schedule, for the first terminal device as a part or all of the first time-frequency resource by using the first downlink control channel, some or all time-frequency resources of the second time-frequency resource used by the second terminal device to send the second uplink message, to perform urgent scheduling for the first terminal device, so that the first terminal device can use the first time-frequency resource to receive the first downlink message sent by the network device, without waiting for completion of sending the second uplink message by the second terminal device, thereby shortening a latency of receiving the first downlink message by the first terminal device, and meeting the latency requirement of the current service on the first terminal device. During specific implementation, the network device may determine the first time-frequency resource with reference to a channel condition of the first terminal device and a size of the first downlink message to be received by the first terminal device. In other words, the first time-frequency resource and the second time-frequency resource may include a same time domain resource and a same frequency domain resource, or in other words, the first time-frequency resource intersects with both a time domain resource and a frequency domain resource of the second time-frequency resource. Optionally, the first time-frequency resource may not only intersect with the time domain resource and frequency domain resource of the second time-frequency resource, but also intersect with a time domain resource and/or frequency domain resource of a time-frequency resource scheduled by the network device for another terminal device, and the like.

Alternatively, when the network device sends the second downlink control channel to the second terminal device to schedule the second terminal device to receive, on the second time-frequency resource, the second downlink message sent by the network device, and time domain resource duration of the second time-frequency resource has not ended, if the network device determines to receive the first uplink message sent by the first terminal device, the network device may interrupt transmission of the second terminal device, and schedule, for the first terminal device as the first time-frequency resource by using the first downlink control channel, some or all time-frequency resources of the second time-frequency resource used by the second terminal device to receive the second downlink message sent by the network device, to perform urgent scheduling for the first terminal device, so that the first terminal device can use the first time-frequency resource to send the first uplink message to the network device without waiting for completion of receiving the second downlink message by the second terminal device, thereby shortening a latency of sending the first uplink message by the first terminal device, and meeting the latency requirement of the current service on the first terminal device. During specific implementation, the network device may determine the first time-frequency resource with reference to a channel condition of the first terminal device and a size of the first uplink message to be sent by the first terminal device. For example, the first time-frequency resource may be one or more symbols in a subframe. In other words, time domain resource duration of the first time-frequency resource may be less than or equal to the time domain resource duration of the second time-frequency resource. In other words, the first time-frequency resource and the second time-frequency resource may include a same time domain resource and a same frequency domain resource, or in other words, the first time-frequency resource intersects with both a time domain resource and a frequency domain resource of the second time-frequency resource. Optionally, the first time-frequency resource may not only intersect with the time domain resource and frequency domain resource of the second time-frequency resource, but also intersect with a time domain resource and/or frequency domain resource of a time-frequency resource scheduled by the network device for another terminal device, and the like.

It should be noted that, the first downlink control channel may be sent by the network device to the first terminal device by using the third time-frequency resource, and considering that the first downlink control channel is a downlink control channel urgently sent by the network device to the first terminal device, the third time-frequency resource may not be sent by using an existing time-frequency resource for sending a downlink control channel. For example, the network device may use, as the third time-frequency resource, all or a part of a time-frequency resource that is scheduled for a terminal device for use, so that the first terminal device can receive the first downlink control channel while using the first time-frequency resource or before using the first time-frequency resource. In other words, the network device sends the first downlink control channel to the first terminal device on a time-frequency resource on which the network device should have received an uplink message sent by a terminal device or should have sent a downlink message to the terminal device. The terminal device herein may be any terminal device that is in a network coverage area and that is scheduled by the network device. Optionally, the terminal device may be, for example, the second terminal device. In other words, the network device may use, as the third time-frequency resource, all or some time-frequency resources of the second time-frequency resource that is scheduled for the second terminal device for use, or in other words, the third time-frequency resource and the second time-frequency resource may include a same time domain resource and/or a same frequency domain resource. A time domain resource start time of the third time-frequency resource may be the same as a time domain resource start time of the first time-frequency resource, or earlier than the time domain resource start time of the first time-frequency resource. When the time domain resource start time of the third time-frequency resource is earlier than the time domain resource start time of the first time-frequency resource, a spectrum width occupied by a frequency domain resource of the third time-frequency resource may be the same as or different from that of a frequency domain resource of the first time-frequency resource.

A person skilled in the art may understand that, S102 and S103 may not be performed in a particular order.

S104. The first terminal device receives the first downlink control channel that is sent by the network device on the third time-frequency resource.

Specifically, the first terminal device may listen, on a time-frequency resource for sending the second downlink control channel, to the second downlink control channel sent by the network device. When the first terminal device determines, by using the second downlink control channel, that the network device does not schedule, on the second time-frequency resource, the first terminal to send the first uplink message to the network device or receive the first downlink message sent by the network device, the first terminal device may listen, in a period of time before the network device sends a next second downlink control channel, to the first downlink control channel sent by the network device, so as to receive the first downlink control channel sent by the network device on the third time-frequency resource.

Optionally, the network device may further send identification information on the time-frequency resource for sending the second downlink control channel, to indicate opportunities for sending the first downlink control channel in the period of time before the network device sends the next second downlink control channel and a time domain resource and/or a frequency domain resource corresponding to each sending opportunity to the first terminal device by using the identification information, so that when listening to the second downlink control channel sent by the network device, the first terminal device can further obtain the identification information, and the first terminal device can determine, based on the identification information, where to listen to the first downlink control channel, to reduce blind detections on the first downlink control channel by the first terminal device, and reduce power consumption of the first terminal device.

S105. The second terminal device receives, on the second time-frequency resource, the second downlink message sent by the network device.

Figure 2:
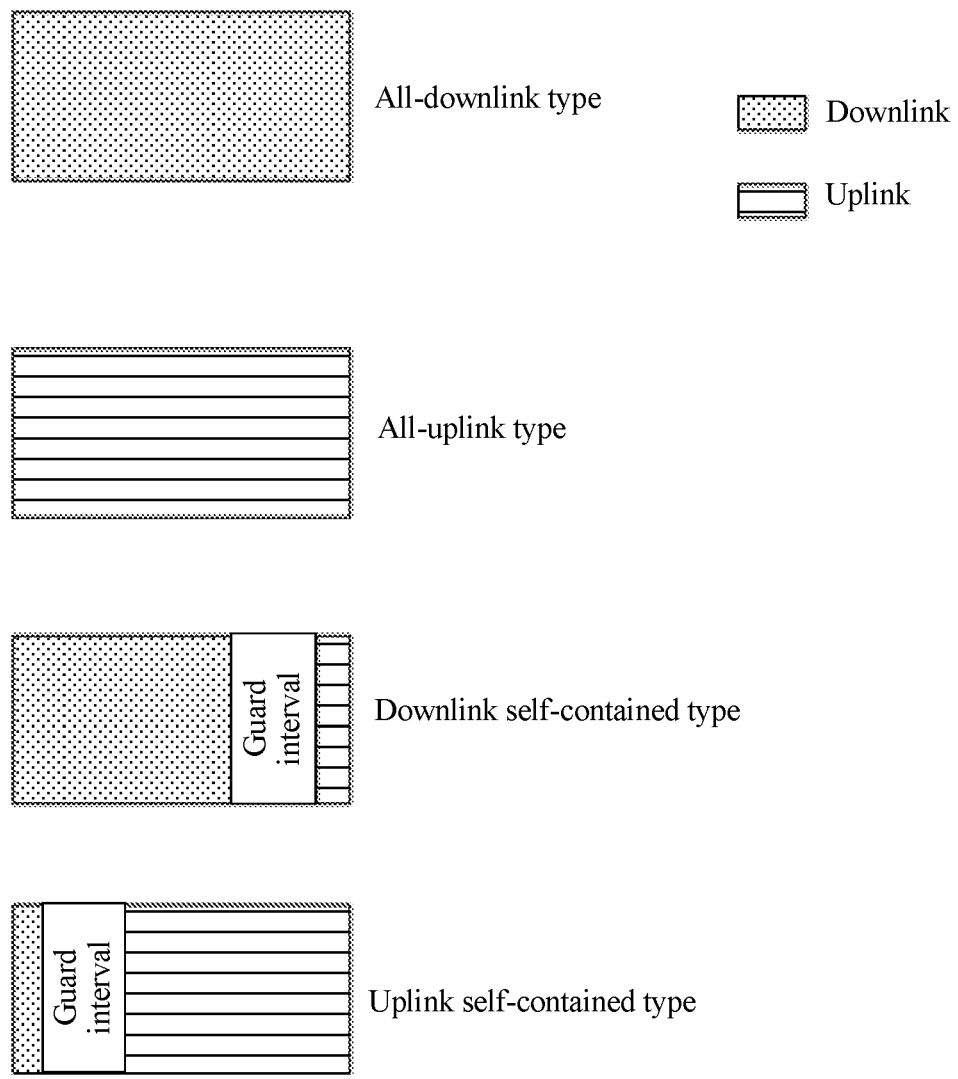
FIG. 2 is a schematic structural diagram of a subframe according to this application.

Specifically, after receiving the second downlink control channel sent by the network device, the second terminal device may determine, based on a subframe type or a time-frequency resource type corresponding to the second time-frequency resource indicated by the second downlink control channel, whether to send the second uplink message or receive the second downlink message on the second time-frequency resource. FIG. 2 is a schematic structural diagram of a subframe according to this application. As shown in FIG. 2, the subframe type may be, for example, an all-downlink type, an all-uplink type, a downlink self-contained type, or an uplink self-contained type. The time-frequency resource type herein may be, for example, uplink or downlink. For example, if the subframe type corresponding to the second time-frequency resource is the all-downlink type or the downlink self-contained type, the second terminal device determines to receive the second downlink message on the second time-frequency resource. Optionally, if the subframe type corresponding to the second time-frequency resource is the all-uplink type or the uplink self-contained type, the second terminal device determines to send the second uplink message on the second time-frequency resource. If the time-frequency resource type corresponding to the second time-frequency resource is downlink, the second terminal device determines to receive the second downlink message on the second time-frequency resource. If the time-frequency resource type corresponding to the second time-frequency resource is uplink, the second terminal device determines to send the second uplink message on the second time-frequency resource.

When the second terminal device determines, based on the subframe type or the time-frequency resource type corresponding to the second time-frequency resource indicated by the second downlink control channel, to receive, on the second time-frequency resource, the second downlink message sent by the network device, the second terminal device receives, on the second time-frequency resource, the second downlink message sent by the network device. Optionally, when the second terminal device determines, based on the subframe type or the time-frequency resource type corresponding to the second time-frequency resource indicated by the second downlink control channel, to send the second uplink message to the network device on the second time-frequency resource, alternatively, S105 may be: The second terminal device sends the second uplink message to the network device on the second time-frequency resource.

S106. The first terminal device sends the first uplink message to the network device on the first time-frequency resource.

Specifically, after receiving the first downlink control channel sent by the network device, the first terminal device may send the first uplink message to the network device on the first time-frequency resource indicated by the first downlink control channel, or receive, on the first time-frequency resource, the first downlink message sent by the network device. During specific implementation, for details of how the first terminal device determines whether to send the first uplink message or receive the first downlink message on the first time-frequency resource, refer to the description in S105 about how the second terminal device determines whether to send the second uplink message or receive the second downlink message on the second time-frequency resource. This is not described in detail again.

When the first terminal device determines, based on a subframe type or a time-frequency resource type corresponding to the first time-frequency resource indicated by the first downlink control channel, to send the first uplink message to the network device on the first time-frequency resource, the first terminal device sends the first uplink message to the network device on the first time-frequency resource. Optionally, when the first terminal device determines, based on the subframe type or the time-frequency resource type corresponding to the first time-frequency resource indicated by the first downlink control channel, to receive, on the first time-frequency resource, the first downlink message sent by the network device, alternatively, S106 may be: The first terminal device receives, on the first time-frequency resource, the first downlink message sent by the network device.

S107. The network device receives, on the first time-frequency resource, the first uplink message sent by the first terminal device, and skips sending the second downlink message to the second terminal device on a same time domain resource that is in the second time-frequency resource and the first time-frequency resource.

Specifically, after scheduling, by using the second downlink control channel, the second terminal device to receive, on the second time-frequency resource, the second downlink message sent by the network device, the network device schedules, by using the first downlink control channel, the first terminal device to send the first uplink message to the network device on the first time-frequency resource. The network device interrupts communication of the second terminal device whose latency requirement of the current service is lower than that of the first terminal device, and uses, as a part or all of the first time-frequency resource, some or all time-frequency resources of the second time-frequency resource used by the second terminal device to receive the second downlink message, to urgently schedule the first terminal device to use the first time-frequency resource to send the first uplink message to the network device. Therefore, the network device chooses to receive, on the first time-frequency resource, the first uplink message sent by the first terminal device, and not to send the second downlink message to the second terminal device on the same time domain resource that is in the second time-frequency resource and the first time-frequency resource, but to send the second downlink message to the second terminal device only on a time domain resource that is in the second time-frequency resource but that is not in the first time-frequency resource. In this way, the network device may interrupt downlink transmission of the second terminal device, to shorten a latency of sending the first uplink message by the first terminal device, to meet the latency requirement of the current service on the first terminal device.

Optionally, if the network device schedules, by using the second downlink control channel, the second terminal device to send the second uplink message to the network device on the second time-frequency resource, and then schedules, by using the first downlink control channel, the first terminal device to receive, on the first time-frequency resource, the first downlink message sent by the network device, alternatively, S107 may be: The network device sends the first downlink message to the first terminal device on the first time-frequency resource, and skips receiving, on a same time domain resource that is in the second time-frequency resource and the first time-frequency resource, the second uplink message sent by the second terminal device. In this case, the network device interrupts communication of the second terminal device whose latency requirement of the current service is lower than that of the first terminal device, and uses, as a part or all of the first time-frequency resource, some or all time-frequency resources of the second time-frequency resource used by the second terminal device to send the second uplink message, to urgently schedule the first terminal device to use the first time-frequency resource to receive the first downlink message sent by the network device. Therefore, the network device sends the first downlink message to the first terminal device on the first time-frequency resource, and does not receive, on the same time domain resource that is in the second time-frequency resource and the first time-frequency resource, the second uplink message sent by the second terminal device, but receives, only on a time domain resource that is in the second time-frequency resource but that is not in the first time-frequency resource, the second uplink message sent by the second terminal device. In this way, the network device may interrupt uplink transmission of the second terminal device, to shorten a latency of sending the first downlink message to the first terminal device, to meet the latency requirement of the current service on the first terminal device.

In the communication method provided in this application, after the network device schedules, by using the second downlink control channel, the second terminal device whose current service has a relatively low latency requirement to send the second uplink message to the network device on the second time-frequency resource or receive, on the second time-frequency resource, the second downlink message sent by the network device, if the network device needs to urgently schedule transmission of the first terminal device whose current service has a high latency requirement, to meet the latency requirement of the current service on the first terminal device, the network device may interrupt transmission of the second terminal device, and allocate, to the first terminal device as a part or all of the first time-frequency resource, some or all time-frequency resources of the time-frequency resource used by the second terminal to send the second uplink message to the network device, so that the first terminal device can use the first time-frequency resource to receive the first downlink message sent by the network device, or allocate, to the first terminal device as a part or all of the first time-frequency resource, some or all time-frequency resources of the time-frequency resource used by the second terminal to receive the second downlink message sent by the network device, so that the first terminal device can use the first time-frequency resource to send the first uplink message to the network device. In this way, the first terminal device can use the first time-frequency resource to perform transmission without waiting for completion of transmission of the second terminal device, thereby shortening a transmission latency of the first terminal device, and meeting the latency requirement of the current service on the first terminal device.

Further, based on the foregoing embodiment, the first downlink message sent by the network device and received by the first terminal device may be, for example, a first downlink data channel sent by the network device to the first terminal device. The first uplink message sent by the first terminal device to the network device may be, for example, a first uplink data channel sent by the first terminal device to the network device, or may be a feedback signal that is of a first downlink data channel and that is sent by the first terminal device to the network device, for example, an ACK signal or a NACK signal of the first downlink data channel.

In an implementation of this application, if the first uplink message is the feedback signal that is of a first downlink data channel and that is sent by the first terminal device to the network device, the first downlink control channel may be further used to schedule the first terminal device to receive, on a fourth time-frequency resource, a third downlink message sent by the network device. The third downlink message may include the first downlink data channel, and transmission directions of the third downlink message and the second downlink message are the same. A time domain resource start time of the fourth time-frequency resource may be the same as or later than the time domain resource start time of the third time-frequency resource, and a time domain resource end time of the fourth time-frequency resource may be earlier than the time domain resource start time of the first time-frequency resource. Optionally, the fourth time-frequency resource may not intersect with the second time-frequency resource, or may include a same time domain resource and/or a same frequency domain resource as the second time-frequency resource. This may be specifically determined based on scheduling of the network device.

Figure 3:
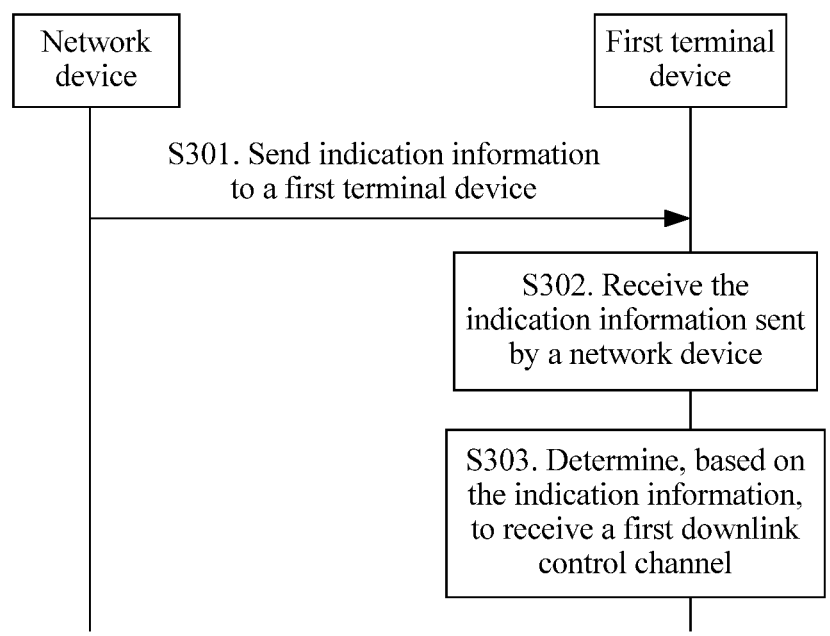
FIG. 3 is a signaling flowchart of another communication method according to this application.

FIG. 3 is a signaling flowchart of another communication method according to this application. Embodiment 2 is related to a specific process in which a network device sends indication information to a first terminal device, to indicate, to the first terminal device, whether the network device is to send a first downlink control channel. Therefore, before the foregoing S103, the method further includes the following steps.

S301. The network device sends the indication information to the first terminal device.

The indication information is used to indicate, to the first terminal device, whether the network device is to send the first downlink control channel.

Specifically, in this embodiment, the network device may send, to the first terminal device, the indication information used to indicate whether the network device is to send the first downlink control channel. The indication information may be sent to the first terminal device by using a time domain resource the same as that occupied by the first downlink control channel, or may be sent to the first terminal device on a time domain resource earlier than the time domain resource for sending the first downlink control channel. This may be specifically determined based on an agreement between the network device and the first terminal device, for example, may be agreed on in a standard, or may be notified by the network device to the first terminal device by using system information or higher layer signaling.

A representation form of the indication information is not limited in this embodiment. For example, the indication information may indicate, by using a flag bit, whether the first downlink control channel is to be sent. Optionally, if the flag bit is 1, it indicates that the network device is to send the first downlink control channel; if the flag bit is 0, it indicates that the network device is not to send the first downlink control channel. Alternatively, if the flag bit is 0, it indicates that the network device is to send the first downlink control channel; if the flag bit is 1, it indicates that the network device is not to send the first downlink control channel. Optionally, the indication information may alternatively indicate, by using a fixed sequence, whether the first downlink control channel is to be sent. In different cells, different sequences may be used, to reduce interference between the cells, and enhance robustness of the indication information.

Optionally, in a valid range of a second downlink control channel, there may be a plurality of time domain resources for sending indication information. The plurality of time domain resources for sending indication information may be agreed on in a standard, or may be notified by the network device to the first terminal device by using system information or higher layer signaling.

S302. The first terminal device receives the indication information sent by the network device.

S303. The first terminal device determines, based on the indication information, to receive the first downlink control channel.

Specifically, after receiving the indication information sent by the network device, the first terminal device may determine, based on the indication information, whether to perform an action of receiving the first downlink control channel, or in other words, determine whether to perform S303. If the indication information indicates that the network device is to send the first downlink control channel, the first terminal device determines to perform the action of receiving the first downlink control channel, or in other words, perform S303. If the indication information indicates that the network device is not to send the first downlink control channel, the first terminal device determines not to perform the action of receiving the first downlink control channel, or in other words, not to perform S303. In this case, the first terminal device may continue to perform S302 on a next time domain resource for sending indication information, or after a next time domain resource for sending a second downlink control channel arrives, listen to the second downlink control channel on a time-frequency resource for sending the second downlink control channel, to determine whether the network device schedules, on the second downlink control channel, the first terminal device to perform transmission.

Further, if the indication information further includes information about a third time-frequency resource, the first terminal device may directly determine, based on the indication information, whether to receive the first downlink control channel on the third time-frequency resource. Optionally, if the indication information includes a time-frequency resource range for receiving the first downlink control channel, the time-frequency resource range may include a time domain resource range and/or a frequency domain resource range, and the time domain resource range and/or the frequency domain resource range may include a time domain resource and/or a frequency domain resource of the third time-frequency resource, the first terminal device may determine, based on the indication information, to receive the first downlink control channel on all time-frequency resources in the time-frequency resource range, to ensure that the first downlink control channel sent by the network device on the third time-frequency resource can be received. If the network device and the first terminal device have preset the third time-frequency resource for sending the first downlink control channel, or in other words, the first terminal device has information about the preset third time-frequency resource, the first terminal device may directly determine, based on the indication information, whether to receive the first downlink control channel on the preset third time-frequency resource.

In this way, the first terminal device can determine, based on the indication information, where to listen to the first downlink control channel, to ensure that the first terminal device can successfully receive the first downlink control channel, thereby reducing blind detections on the first downlink control channel by the first terminal device, reducing blind detection complexity, and reducing power consumption of the first terminal device.

Optionally, in another implementation of this application, the indication information may further include information about a time-frequency resource for sending next indication information, to reduce blind detections on the indication information by the first terminal device, reduce blind detection complexity, and reduce power consumption of the first terminal device.

In the communication method provided in this application, in addition to shortening a transmission latency of the first terminal device, and meeting a latency requirement of a current service on the first terminal device, the network device sends, to the terminal device, the indication information used to indicate whether the network device is to send the first downlink control channel, so that the first terminal device can determine, based on the indication information, where to listen to the first downlink control channel, to ensure that the first terminal device can successfully receive the first downlink control channel, thereby reducing blind detections on the first downlink control channel by the first terminal device, reducing blind detection complexity, and reducing power consumption of the first terminal device.

Further, based on the foregoing embodiment, when transmission of a second downlink message sent by the network device to the second terminal device is interrupted by the network device because the network device urgently schedules the first terminal device to send a first uplink message to the network device, after receiving, on a second time-frequency resource, a downlink message sent by the network device, the second terminal device may further determine whether the downlink message is a complete second downlink message.

Specifically, in a process of receiving the downlink message sent by the network device, after the second terminal device detects that the first downlink control channel exists in a signal received by the second terminal device, if the second terminal device can demodulate the first downlink control channel, the second terminal device may obtain a first time-frequency resource indicated by the first downlink control channel, so that the second terminal device can compare the first time-frequency resource with the second time-frequency resource used by the second terminal device to receive the second downlink message, to determine whether intersections exist in time domain and frequency domain. If the intersections exist, the second terminal device may determine that the downlink message received by the second terminal device is not a complete second downlink message, and the second terminal device may decode, in an existing manner for decoding an incompletely received message, the downlink message received by the second terminal device, to ensure a decoding success rate of the downlink message received by the second terminal device. For details of how the second terminal device decodes, in the existing manner for decoding an incompletely received message, the downlink message received by the second terminal device, refer to the prior art. This is not described in detail.

If the second terminal device cannot decode the first downlink control channel, the second terminal device cannot directly determine whether the second time-frequency resource used by the second terminal device intersects with the first time-frequency resource, and the second terminal device may consider by default that the second time-frequency resource of the second terminal device is all occupied by the first time-frequency resource, and the second terminal device discards the downlink message received this time, and does not perform demodulation. In other words, the second terminal device considers by default that the downlink message received by the second terminal device is not a complete second downlink message. Optionally, the second terminal device may alternatively estimate a range of the first time-frequency resource, and by using the estimated range of the first time-frequency resource, decode, in the existing manner for decoding an incompletely received message, the downlink message received by the second terminal device, and decode, in an existing manner for decoding a complete received message, the downlink message received by the second terminal device, to determine which decoding may succeed, to determine whether the downlink message received by the second terminal device is a complete second downlink message.

The second terminal device may estimate the range of the first time-frequency resource in the following manner. For example, the second terminal device estimates the range of the first time-frequency resource by using a preset time domain range in which the first downlink control channel can be scheduled. Alternatively, the second terminal device considers by default that a time domain range of the first time-frequency resource starts from when the second terminal device detects the first downlink control channel to a time domain resource start time of a time-frequency resource for sending a next second downlink control channel. Alternatively, the second terminal device considers by default that a time domain range of the first time-frequency resource starts from when the second terminal device detects the first downlink control channel to a time domain resource start time of a time-frequency resource for sending a next first downlink control channel. Alternatively, the second terminal device estimates the range of the first time-frequency resource by using a time domain and/or frequency domain range that is carried in common information of the first downlink control channel and in which the first downlink control channel can be scheduled. Alternatively, the second terminal device estimates the range of the first time-frequency resource by using a frequency domain range, notified by higher layer signaling, of the first time-frequency resource.

The communication method provided in this application is described below in detail with reference to specific examples.

Example 1

Figure 4:
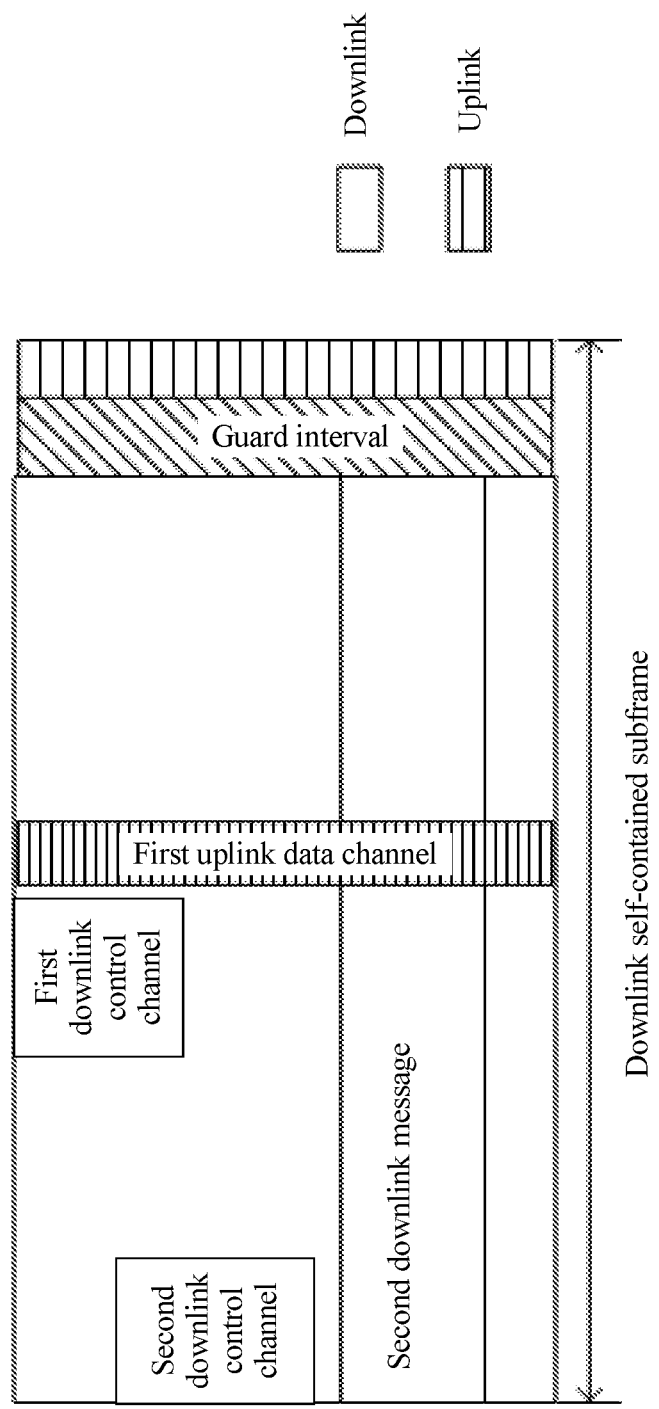
FIG. 4 is a schematic diagram 1 of a time-frequency resource according to this application.

FIG. 4 is a schematic diagram 1 of a time-frequency resource according to this application. As shown in FIG. 4, in this example, a subframe type corresponding to a second time-frequency resource is a downlink self-contained type. In other words, the second time-frequency resource is a time-frequency resource in a downlink self-contained subframe. A first uplink message is a first uplink data channel.

Specifically, when a network device schedules, by using a second downlink control channel, a second terminal device to receive, on all downlink symbols of the downlink self-contained subframe, a second downlink message sent by the network device, and before downlink symbol duration of the downlink self-contained subframe ends, if the network device determines to receive the first uplink data channel sent by a first terminal device, the network device may interrupt transmission of the second terminal device, and schedule, for the first terminal device as some time-frequency resources of a first time-frequency resource by using a first downlink control channel, some or all time-frequency resources in the downlink self-contained subframe used by the second terminal device to receive the second downlink message sent by the network device, to perform urgent scheduling for the first terminal device, so that the first terminal device can use the first time-frequency resource to send the first uplink data channel to the network device in the downlink self-contained subframe without waiting for completion of receiving the second downlink message by the second terminal device, thereby shortening a latency of sending the first uplink data channel by the first terminal device, and meeting a latency requirement of a current service on the first terminal device. FIG. 4 is a schematic diagram showing that some time domain resources of the second time-frequency resource in the downlink self-contained subframe are used as a time domain resource of the first time-frequency resource, and all frequency domain resources of the second time-frequency resource in the downlink self-contained subframe are used as some frequency domain resources of the first time-frequency resource. As shown in FIG. 4, a "second downlink message" part in a box in FIG. 4 is a region occupied by the second time-frequency resource, and a "first uplink data channel" part in a box is a region occupied by the first time-frequency resource.

A time domain resource start time of a time-frequency resource used by the network device to send the second downlink control channel may be earlier than or the same as a time domain resource start time of the second time-frequency resource. FIG. 4 is a schematic diagram showing that the time domain resource start time for sending the second downlink control channel may be the same as the time domain resource start time of the second time-frequency resource. In other words, the second downlink control channel is also sent to the second terminal device in the downlink self-contained subframe.

A time domain resource start time of a third time-frequency resource used by the network device to send the first downlink control channel may be earlier than a time domain resource start time of the first time-frequency resource. In other words, the third time-frequency resource may be a time-frequency resource in a subframe earlier than the downlink self-contained subframe, or may be a time-frequency resource in the downlink self-contained subframe. When the third time-frequency resource is the time-frequency resource in the downlink self-contained subframe, the third time-frequency resource and the second time-frequency resource may include a same time domain resource and/or a same frequency domain resource. FIG. 4 is a schematic diagram showing that the third time-frequency resource and the second time-frequency resource include a same time domain resource. As shown in FIG. 4, a "first downlink control channel" part in a box in FIG. 4 is a region occupied by the third time-frequency resource.

Example 2

Figure 5:
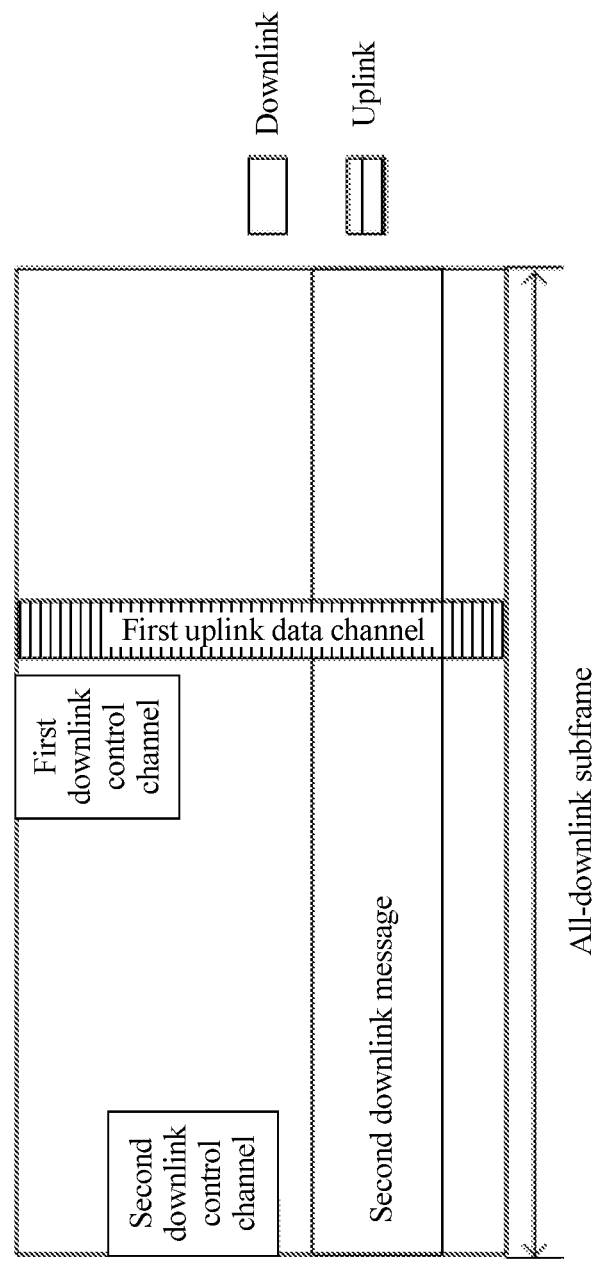
FIG. 5 is a schematic diagram 2 of a time-frequency resource according to this application.

FIG. 5 is a schematic diagram 2 of a time-frequency resource according to this application. As shown in FIG. 5, in this example, a subframe type corresponding to a second time-frequency resource is an all-downlink type. In other words, the second time-frequency resource is a time-frequency resource in an all-downlink subframe. A first uplink message is a first uplink data channel.

Specifically, when a network device schedules, by using a second downlink control channel, a second terminal device to receive, on all symbols of the all-downlink subframe, a second downlink message sent by the network device, and before downlink symbol duration of the all-downlink subframe ends, if the network device determines to receive the first uplink data channel sent by a first terminal device, the network device may interrupt transmission of the second terminal device, and schedule, for the first terminal device as some time-frequency resources of a first time-frequency resource by using a first downlink control channel, some or all time-frequency resources in the all-downlink subframe used by the second terminal device to receive the second downlink message sent by the network device, to perform urgent scheduling for the first terminal device, so that the first terminal device can use the first time-frequency resource to send the first uplink data channel to the network device in the all-downlink subframe without waiting for completion of receiving the second downlink message by the second terminal device, thereby shortening a latency of sending the first uplink data channel by the first terminal device, and meeting a latency requirement of a current service on the first terminal device. FIG. 5 is a schematic diagram showing that some time domain resources of the second time-frequency resource in the all-downlink subframe are used as a time-frequency resource of the first time-frequency resource, and all frequency domain resources of the second time-frequency resource in the all-downlink subframe are used as some frequency domain resources of the first time-frequency resource. As shown in FIG. 5, a "second downlink message" part in a box in FIG. 5 is a region occupied by the second time-frequency resource, and a "first uplink data channel" part in a box is a region occupied by the first time-frequency resource.

A time domain resource start time of a time-frequency resource used by the network device to send the second downlink control channel may be earlier than or the same as a time domain resource start time of the second time-frequency resource. FIG. 5 is a schematic diagram showing that the time domain resource start time for sending the second downlink control channel may be the same as the time domain resource start time of the second time-frequency resource. In other words, the second downlink control channel is also sent to the second terminal device in the all-downlink subframe. As shown in FIG. 5, a "second downlink control channel" part in a box in FIG. 5 is a region occupied by the time-frequency resource used for sending the second downlink control channel.

A time domain resource start time of a third time-frequency resource used by the network device to send the first downlink control channel may be earlier than a time domain resource start time of the first time-frequency resource. In other words, the third time-frequency resource may be a time-frequency resource in a subframe earlier than the all-downlink subframe, or may be a time-frequency resource in the all-downlink subframe. When the third time-frequency resource is the time-frequency resource in the all-downlink subframe, the third time-frequency resource and the second time-frequency resource may include a same time domain resource and/or a same frequency domain resource. FIG. 5 is a schematic diagram showing that the third time-frequency resource and the second time-frequency resource include a same time domain resource. As shown in FIG. 5, a "first downlink control channel" part in a box in FIG. 5 is a region occupied by the third time-frequency resource.

Example 3

Figure 6:
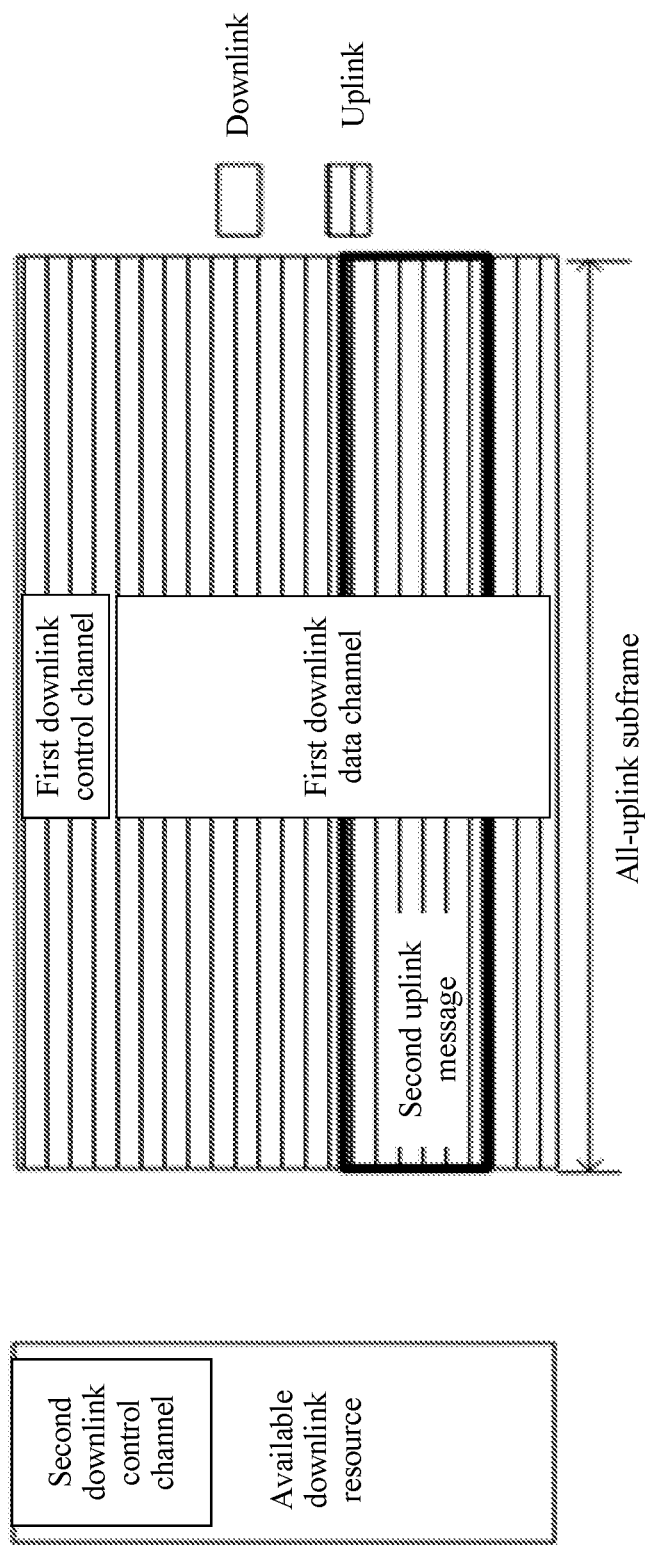
FIG. 6 is a schematic diagram 3 of a time-frequency resource according to this application.

FIG. 6 is a schematic diagram 3 of a time-frequency resource according to this application. As shown in FIG. 6, in this example, a subframe type corresponding to a second time-frequency resource is an all-uplink type. In other words, the second time-frequency resource is a time-frequency resource in an all-uplink subframe. A first downlink message is a first downlink data channel.

Specifically, when a network device schedules, by using a second downlink control channel, a second terminal device to send a second uplink message to the network device on all symbols of the all-uplink subframe, and before uplink symbol duration of the all-uplink subframe ends, if the network device determines to send the first downlink data channel to a first terminal device, the network device may interrupt transmission of the second terminal device, and schedule, for the first terminal device as some time-frequency resources of a first time-frequency resource by using a first downlink control channel, some or all time-frequency resources in the all-uplink subframe used by the second terminal device to send the second uplink message to the network device, to perform urgent scheduling for the first terminal device, so that the first terminal device can use the first time-frequency resource to receive, in the all-uplink subframe, the first downlink data channel sent by the network device, without waiting for completion of sending the second uplink message by the second terminal device, thereby shortening a latency of receiving the first downlink data channel by the first terminal device, and meeting a latency requirement of a current service on the first terminal device. FIG. 6 is a schematic diagram showing that some time domain resources of the second time-frequency resource in the all-uplink subframe are used as a time-frequency resource of the first time-frequency resource, and all frequency domain resources of the second time-frequency resource in the all-uplink subframe are used as some frequency domain resources of the first time-frequency resource. As shown in FIG. 6, a "second uplink message" part in a box in FIG. 6 is a region occupied by the second time-frequency resource, and a "first downlink data channel" part in a box is a region occupied by the first time-frequency resource.

As shown in FIG. 6, because the second terminal device sends the second uplink message, and the second time-frequency resource is a time-frequency resource in the all-uplink subframe, a time domain resource start time of a time-frequency resource used by the network device to send the second downlink control channel may be earlier than a time domain resource start time of the second time-frequency resource. In other words, the network device may send the second downlink control channel to the second terminal device by using an available downlink time-frequency resource in another subframe earlier than the all-uplink subframe. As shown in FIG. 6, a "second downlink control channel" part in a box in FIG. 6 is a region occupied by the time-frequency resource used for sending the second downlink control channel.

A time domain resource start time of a third time-frequency resource used by the network device to send the first downlink control channel may be earlier than or the same as a time domain resource start time of the first time-frequency resource. In other words, the third time-frequency resource may be a time-frequency resource in a subframe earlier than the all-uplink subframe, or may be a time-frequency resource in the all-uplink subframe. When the third time-frequency resource is the time-frequency resource in the all-uplink subframe, the third time-frequency resource and the second time-frequency resource may include a same time domain resource and/or a same frequency domain resource. FIG. 6 is a schematic diagram showing that the third time-frequency resource and the second time-frequency resource include a same time domain resource, and the time domain resource start time of the third time-frequency resource may be the same as the time domain resource start time of the first time-frequency resource. As shown in FIG. 6, a "first downlink control channel" part in a box in FIG. 6 is a region occupied by the third time-frequency resource.

Example 4

Figure 7:
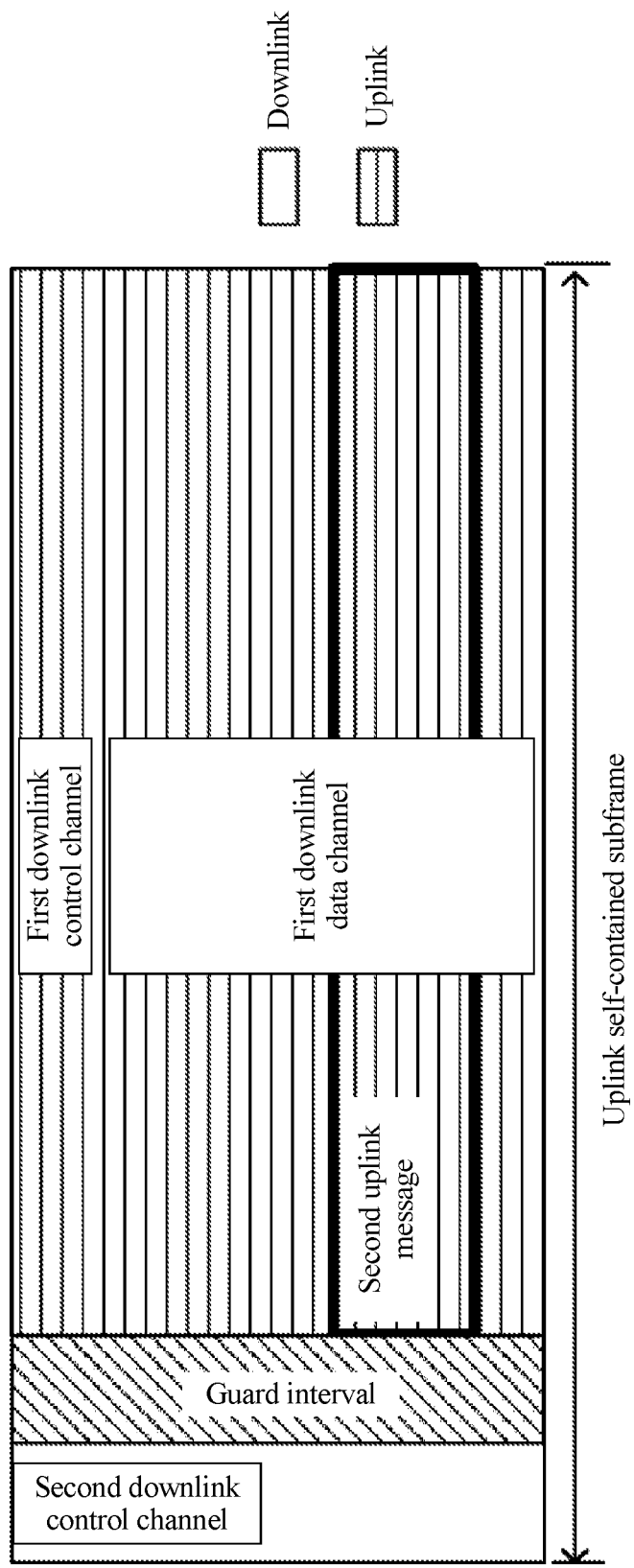
FIG. 7 is a schematic diagram 4 of a time-frequency resource according to this application.

FIG. 7 is a schematic diagram 4 of a time-frequency resource according to this application. As shown in FIG. 7, in this example, a subframe type corresponding to a second time-frequency resource is an uplink self-contained type. In other words, the second time-frequency resource is a time-frequency resource in an uplink self-contained subframe. A first downlink message is a first downlink data channel.

Specifically, when a network device schedules, by using a second downlink control channel, a second terminal device to send a second uplink message to the network device on all uplink symbols of the uplink self-contained subframe, and before uplink symbol duration of the uplink self-contained subframe ends, if the network device determines to send the first downlink data channel to a first terminal device, the network device may interrupt transmission of the second terminal device, and schedule, for the first terminal device as some time-frequency resources of a first time-frequency resource by using a first downlink control channel, some or all time-frequency resources in the uplink self-contained subframe used by the second terminal device to send the second uplink message to the network device, to perform urgent scheduling for the first terminal device, so that the first terminal device can use the first time-frequency resource to receive, in the uplink self-contained subframe, the first downlink data channel sent by the network device, without waiting for completion of sending the second uplink message by the second terminal device, thereby shortening a latency of receiving the first downlink data channel by the first terminal device, and meeting a latency requirement of a current service on the first terminal device. FIG. 7 is a schematic diagram showing that some time domain resources of the second time-frequency resource in the uplink self-contained subframe are used as a time-frequency resource of the first time-frequency resource, and all frequency domain resources of the second time-frequency resource in the uplink self-contained subframe are used as some frequency domain resources of the first time-frequency resource. As shown in FIG. 7, a "second uplink message" part in a box in FIG. 7 is a region occupied by the second time-frequency resource, and a "first downlink data channel" part in a box is a region occupied by the first time-frequency resource.

Because the second terminal device sends the second uplink message, and the second time-frequency resource is a time-frequency resource in the uplink self-contained subframe, a time domain resource start time of a time-frequency resource used by the network device to send the second downlink control channel may be earlier than a time domain resource start time of the second time-frequency resource. In other words, the network device may send the second downlink control channel to the second terminal device by using an available downlink time-frequency resource in another subframe earlier than the uplink self-contained subframe, or may send the second downlink control channel to the second terminal device by using a downlink time-frequency resource on a downlink symbol that is in the uplink self-contained subframe and that is located before an uplink symbol. FIG. 7 is a schematic diagram showing that the network device sends the second downlink control channel to the second terminal device by using a downlink time-frequency resource in the uplink self-contained subframe. As shown in FIG. 7, a "second downlink control channel" part in a box in FIG. 7 is a region occupied by the time-frequency resource used for sending the second downlink control channel.

A time domain resource start time of a third time-frequency resource used by the network device to send the first downlink control channel may be earlier than or the same as a time domain resource start time of the first time-frequency resource. In other words, the third time-frequency resource may be a downlink time-frequency resource in a subframe earlier than the uplink self-contained subframe, or may be a time-frequency resource in the uplink self-contained subframe. When the third time-frequency resource is the time-frequency resource in the uplink self-contained subframe, the third time-frequency resource may be a downlink time-frequency resource in the uplink self-contained subframe, namely, a downlink time-frequency resource on a downlink symbol that is in the uplink self-contained subframe and that is located before an uplink symbol, or may be an uplink time-frequency resource in the uplink self-contained subframe. In this case, the third time-frequency resource and the second time-frequency resource may include a same time domain resource and/or a same frequency domain resource. FIG. 7 is a schematic diagram showing that the third time-frequency resource and the second time-frequency resource include a same time domain resource, and the time domain resource start time of the third time-frequency resource may be the same as the time domain resource start time of the first time-frequency resource. As shown in FIG. 7, a "first downlink control channel" part in a box in FIG. 7 is a region occupied by the third time-frequency resource.

Example 5

Figure 8:
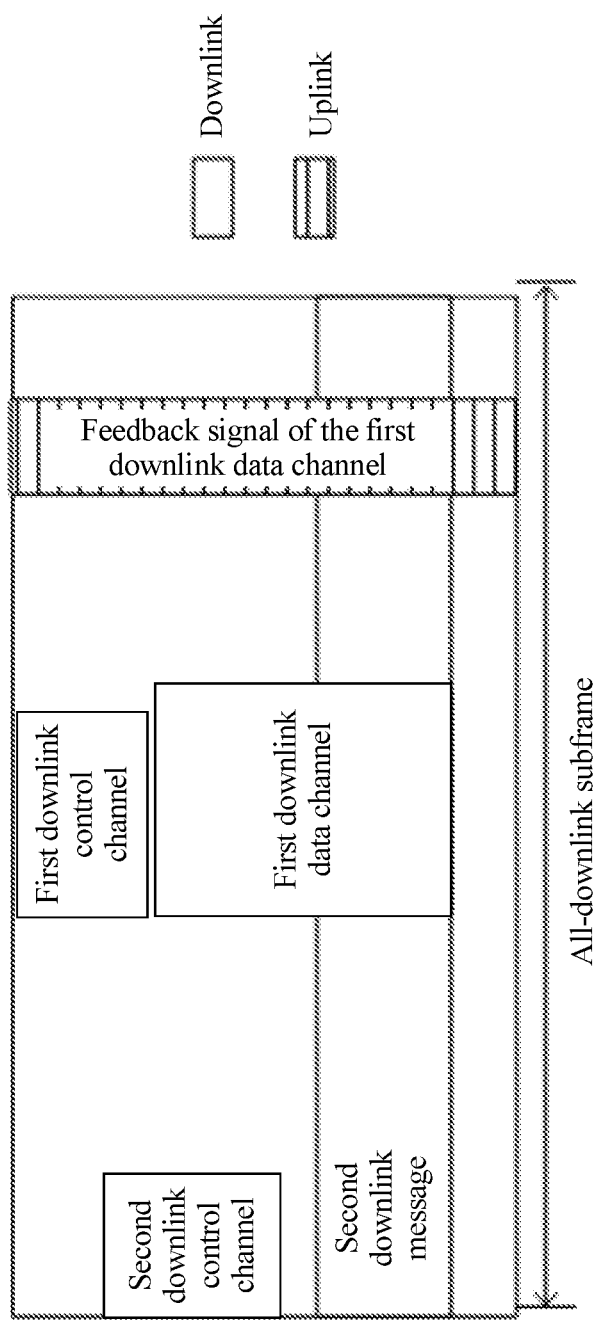
FIG. 8 is a schematic diagram 5 of a time-frequency resource according to this application.

FIG. 8 is a schematic diagram 5 of a time-frequency resource according to this application. As shown in FIG. 8, in this example, a subframe type corresponding to a second time-frequency resource is an all-downlink type. In other words, the second time-frequency resource is a time-frequency resource in an all-downlink subframe. A third downlink message is a first downlink data channel, and a first uplink message is a feedback signal of the first downlink data channel.

Specifically, when a network device schedules, by using a second downlink control channel, a second terminal device to receive, on all downlink symbols of the all-downlink subframe, a second downlink message sent by the network device, and before downlink symbol duration of the all-downlink subframe ends, if the network device determines to send the first downlink data channel to a first terminal device, the network device may interrupt transmission of the second terminal device, and schedule, for the first terminal device as some time-frequency resources of a fourth time-frequency resource by using a first downlink control channel, some time-frequency resources in the all-downlink subframe used by the second terminal device to receive the second downlink message sent by the network device, to perform urgent scheduling for the first terminal device, so that the first terminal device can use the fourth time-frequency resource to receive, in the all-downlink subframe, the first downlink data channel sent by the network device, without waiting for completion of receiving the second downlink message by the second terminal device.

In addition, to further meet a latency requirement of a current service on the first terminal device, after the first terminal device uses the fourth time-frequency resource to receive the first downlink data channel sent by the network device, the network device may further interrupt transmission of the second terminal device again, and schedule, for the first terminal device as some time-frequency resources of a first time-frequency resource by using the first downlink control channel, some other time-frequency resources in the all-downlink subframe used by the second terminal device to receive the second downlink message sent by the network device, to perform urgent scheduling for the first terminal device, so that the first terminal device can use the first time-frequency resource to send the feedback signal of the first downlink data channel to the network device in the all-downlink subframe without waiting for completion of receiving the second downlink message by the second terminal device, thereby shortening a latency of sending the feedback signal of the first downlink data channel by the first terminal device, and meeting the latency requirement of the current service on the first terminal device. FIG. 8 is a schematic diagram showing that some time domain resources of the second time-frequency resource in the all-downlink subframe are used as a time domain resource of the fourth time-frequency resource, all frequency domain resources of the second time-frequency resource in the all-downlink subframe are used as some frequency domain resources of the fourth time-frequency resource, some time domain resources that are of the second time-frequency resource in the all-downlink subframe and that are later than the fourth time-frequency resource are used as a time domain resource of the first time-frequency resource, and all the frequency domain resources of the second time-frequency resource in the all-downlink subframe are used as some frequency domain resources of the first time-frequency resource. As shown in FIG. 8, a "second uplink message" part in a box in FIG. 8 is a region occupied by the second time-frequency resource, a "first downlink data channel" part in a box is a region occupied by the fourth time-frequency resource, and a "feedback signal of the first downlink data channel" part in a box is a region occupied by the first time-frequency resource.

A time domain resource start time of a time-frequency resource used by the network device to send the second downlink control channel may be earlier than or the same as a time domain resource start time of the second time-frequency resource. FIG. 8 is a schematic diagram showing that the time domain resource start time for sending the second downlink control channel may be the same as the time domain resource start time of the second time-frequency resource. In other words, the second downlink control channel is also sent to the second terminal device in the all-downlink subframe. As shown in FIG. 8, a "second downlink control channel" part in a box in FIG. 8 is a region occupied by the time-frequency resource used for sending the second downlink control channel.

A time domain resource start time of a third time-frequency resource used by the network device to send the first downlink control channel may be earlier than or the same as a time domain resource start time of the fourth time-frequency resource. In other words, the third time-frequency resource may be a downlink time-frequency resource in a subframe earlier than the all-downlink subframe, or may be a time-frequency resource in the all-downlink subframe. When the third time-frequency resource is the time-frequency resource in the all-downlink subframe, the third time-frequency resource and the second time-frequency resource may include a same time domain resource and/or a same frequency domain resource. FIG. 8 is a schematic diagram showing that the third time-frequency resource and the second time-frequency resource include a same time domain resource, and the time domain resource start time of the third time-frequency resource may be the same as the time domain resource start time of the first time-frequency resource. As shown in FIG. 8, a "first downlink control channel" part in a box in FIG. 8 is a region occupied by the third time-frequency resource.

Example 6

Figure 9:
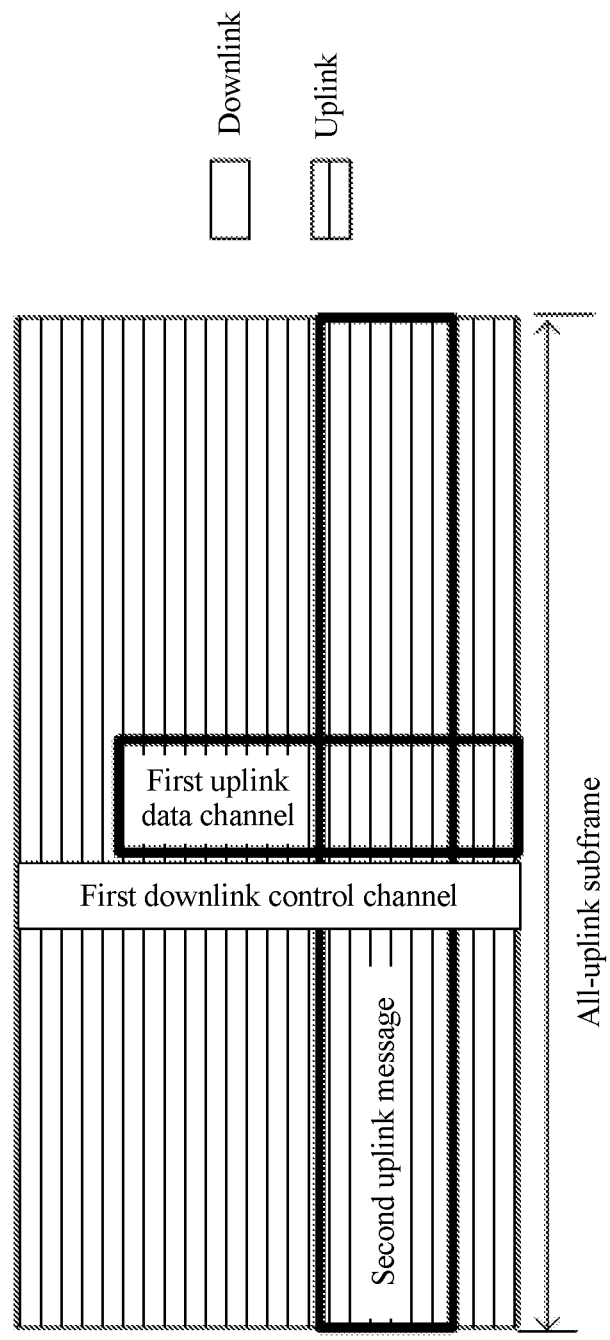
FIG. 9 is a schematic diagram 6 of a time-frequency resource according to this application.

FIG. 9 is a schematic diagram 6 of a time-frequency resource according to this application. As shown in FIG. 9, in this example, a subframe type corresponding to a second time-frequency resource is an all-uplink type. In other words, the second time-frequency resource is a time-frequency resource in an all-uplink subframe. A first uplink message is a first uplink data channel.

Specifically, when a network device schedules, by using a second downlink control channel, a second terminal device to send a second uplink message to the network device on all uplink symbols of the all-uplink subframe, and before uplink symbol duration of the all-uplink subframe ends, if the network device determines to receive the first uplink data channel sent by a first terminal device, the network device may interrupt transmission of the second terminal device, and schedule, for the first terminal device as some time-frequency resources of a first time-frequency resource by using a first downlink control channel, some time-frequency resources in the all-uplink subframe used by the second terminal device to send the second uplink message to the network device, to perform urgent scheduling for the first terminal device, so that the first terminal device can use the first time-frequency resource to send the first uplink data channel to the network device in the all-uplink subframe without waiting for completion of sending the second uplink message by the second terminal device, thereby shortening a latency of sending the first uplink data channel by the first terminal device, and meeting a latency requirement of a current service on the first terminal device.

In this case, if the network device does not have an available downlink time-frequency resource to send the first downlink control channel to the first terminal device before a time domain resource of the first time-frequency resource starts, the network device may interrupt transmission of the second terminal device, and use, as some time-frequency resources of a third time-frequency resource, some other time-frequency resources in the all-uplink subframe used by the second terminal device to send the second uplink message to the network device, so that the network device can use the third time-frequency resource to successfully send the first downlink control channel to the first terminal device, and after receiving the first downlink control channel, the first terminal device can use the first time-frequency resource scheduled by using the first downlink control channel to send the first uplink data channel to the network device in the all-uplink subframe, thereby shortening the latency of sending the first uplink data channel by the first terminal device, and meeting the latency requirement of the current service on the first terminal device. FIG. 9 is a schematic diagram showing that some time domain resources of the second time-frequency resource in the all-uplink subframe are used as a time-frequency resource of the third time-frequency resource, and all frequency domain resources of the second time-frequency resource in the all-uplink subframe are used as some frequency domain resources of the third time-frequency resource. As shown in FIG. 9, a "second uplink message" part in a box in FIG. 9 is a region occupied by the second time-frequency resource, and a "first downlink control channel" part in a box is a region occupied by the third time-frequency resource.

Example 7

Figure 10:
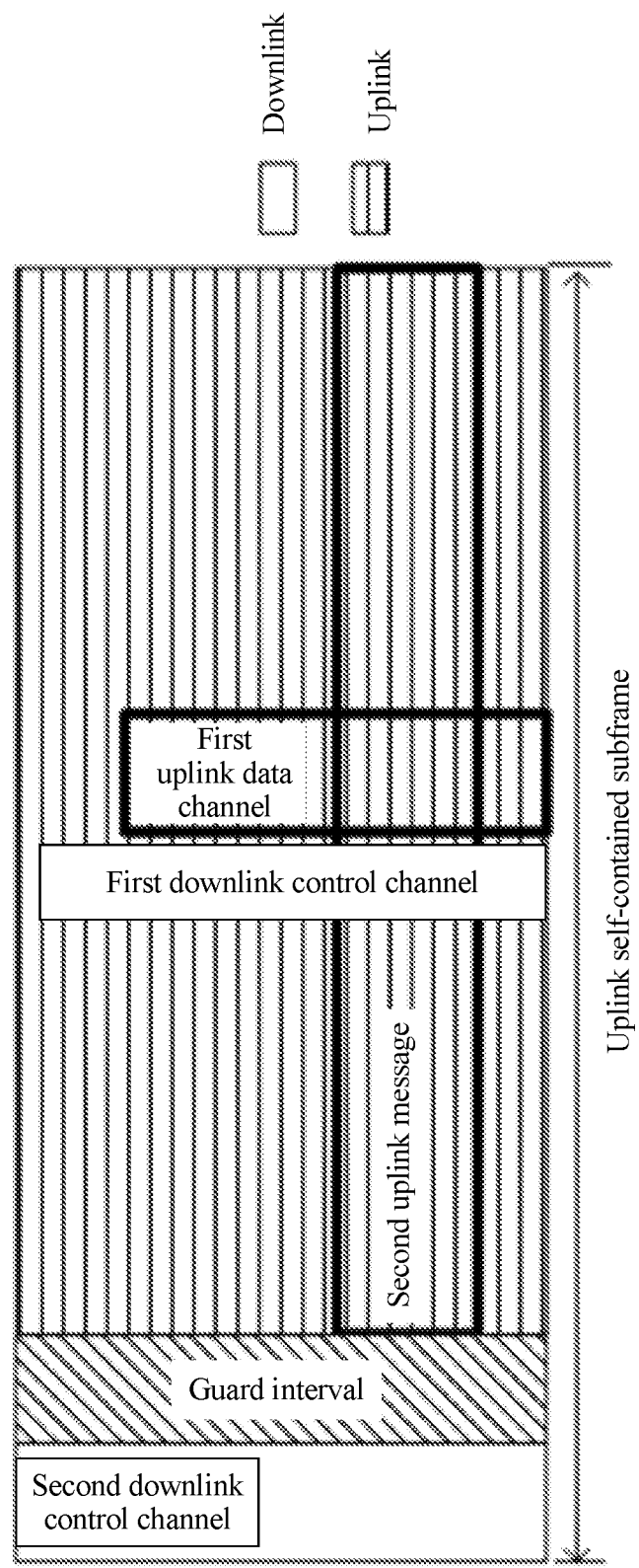
FIG. 10 is a schematic diagram 7 of a time-frequency resource according to this application.

FIG. 10 is a schematic diagram 7 of a time-frequency resource according to this application. As shown in FIG. 10, in this example, a subframe type corresponding to a second time-frequency resource is an uplink self-contained type. In other words, the second time-frequency resource is a time-frequency resource in an uplink self-contained subframe. A first uplink message is a first uplink data channel.

Specifically, when a network device schedules, by using a second downlink control channel, a second terminal device to send a second uplink message to the network device on all uplink symbols of the uplink self-contained subframe, and before uplink symbol duration of the uplink self-contained subframe ends, if the network device determines to receive the first uplink data channel sent by a first terminal device, the network device may interrupt transmission of the second terminal device, and schedule, for the first terminal device as some time-frequency resources of a first time-frequency resource by using a first downlink control channel, some time-frequency resources in the uplink self-contained subframe used by the second terminal device to send the second uplink message to the network device, to perform urgent scheduling for the first terminal device, so that the first terminal device can use the first time-frequency resource to send the first uplink data channel to the network device in the uplink self-contained subframe without waiting for completion of sending the second uplink message by the second terminal device, thereby shortening a latency of sending the first uplink data channel by the first terminal device, and meeting a latency requirement of a current service on the first terminal device.

In this case, if the network device does not have an available downlink time-frequency resource to send the first downlink control channel to the first terminal device before a time domain resource of the first time-frequency resource starts, the network device may interrupt transmission of the second terminal device, and use, as some time-frequency resources of a third time-frequency resource, some other uplink time-frequency resources in the uplink self-contained subframe used by the second terminal device to send the second uplink message to the network device, so that the network device can use the third time-frequency resource to successfully send the first downlink control channel to the first terminal device, and after receiving the first downlink control channel, the first terminal device can use the first time-frequency resource scheduled by using the first downlink control channel to send the first uplink data channel to the network device in the uplink self-contained subframe, thereby shortening the latency of sending the first uplink data channel by the first terminal device, and meeting the latency requirement of the current service on the first terminal device. FIG. 10 is a schematic diagram showing that some time domain resources of the second time-frequency resource in the uplink self-contained subframe are used as a time-frequency resource of the third time-frequency resource, and all frequency domain resources of the second time-frequency resource in the uplink self-contained subframe are used as some frequency domain resources of the third time-frequency resource. As shown in FIG. 10, a "second uplink message" part in a box in FIG. 10 is a region occupied by the second time-frequency resource, and a "first downlink control channel" part in a box is a region occupied by the third time-frequency resource.

In the communication method provided in this application, after the network device schedules, by using the second downlink control channel, the second terminal device whose current service has a relatively low latency requirement to send the second uplink message to the network device on the second time-frequency resource or receive, on the second time-frequency resource, the second downlink message sent by the network device, if the network device needs to urgently schedule transmission of the first terminal device whose current service has a high latency requirement, to meet the latency requirement of the current service on the first terminal device, the network device may interrupt transmission of the second terminal device, and allocate, to the first terminal device as a part or all of the first time-frequency resource, some or all time-frequency resources of the time-frequency resource used by the second terminal to send the second uplink message to the network device, so that the first terminal device can use the first time-frequency resource to receive the first downlink message sent by the network device, or allocate, to the first terminal device as a part or all of the first time-frequency resource, some or all time-frequency resources of the time-frequency resource used by the second terminal to receive the second downlink message sent by the network device, so that the first terminal device can use the first time-frequency resource to send the first uplink message to the network device. In this way, the first terminal device can use the first time-frequency resource to perform transmission without waiting for completion of transmission of the second terminal device, thereby shortening a transmission latency of the first terminal device, and meeting the latency requirement of the current service on the first terminal device.

A person of ordinary skill in the art may understand that all or some of the steps of the method embodiments may be implemented by a program instructing relevant hardware. The program may be stored in a computer-readable storage medium. When the program is executed, the steps of the method embodiments are performed. The storage medium includes any medium that can store program code, such as a ROM, a RAM, a magnetic disk, or an optical disc.

Figure 11:
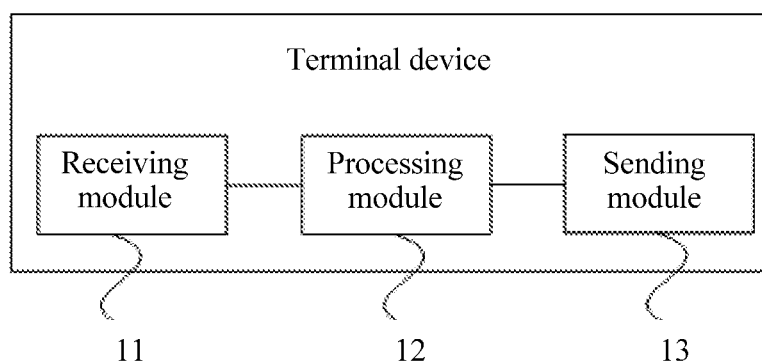
FIG. 11 is a schematic structural diagram of a terminal device according to this application.

FIG. 11 is a schematic structural diagram of a terminal device according to this application. As shown in FIG. 11, the terminal device may be a first terminal device, and the first terminal device may include: a receiving module 11, a processing module 12, and a sending module 13.

The receiving module 11 is configured to receive a first downlink control channel that is sent by a network device on a third time-frequency resource.

The processing module 12 is configured to control, based on the first downlink control channel, the sending module 13 to send a first uplink message to the network device on a first time-frequency resource, where transmission directions of the first uplink message and a second downlink message are different, and the second downlink message is a message that is sent by the network device and that the network device schedules, by using a second downlink control channel, a second terminal device to receive on a second time-frequency resource; or control, based on the first downlink control channel, the receiving module 11 to receive, on the first time-frequency resource, a first downlink message sent by the network device, where transmission directions of the first downlink message and a second uplink message are different, and the second uplink message is a message that the network device schedules, by using the second downlink control channel, the second terminal device to send to the network device on the second time-frequency resource.

The first time-frequency resource and the second time-frequency resource include a same time domain resource and a same frequency domain resource.

During specific implementation, the receiving module 11 may be a receiver of the terminal device, the processing module 12 may be a processing component, such as a processor, of the terminal device, and the sending module 13 may be a transmitter of the terminal device.

The terminal device provided in this application may be configured to perform steps performed by the first terminal device in the method embodiment shown in FIG. 1, implementation principles and technical effects thereof are similar, and details are not described herein again.

Optionally, the third time-frequency resource and the second time-frequency resource include a same time domain resource and/or a same frequency domain resource.

Optionally, the first uplink message includes a first uplink data channel, and the first downlink message includes a first downlink data channel.

Optionally, the first uplink message includes a feedback signal of a first downlink data channel; and the first downlink control channel is further used to schedule the first terminal device to receive, on a fourth time-frequency resource, a third downlink message sent by the network device, where the third downlink message includes the first downlink data channel, transmission directions of the third downlink message and the second downlink message are the same, the fourth time-frequency resource and the second time-frequency resource include a same time domain resource and/or a same frequency domain resource, and a time domain resource of the fourth time-frequency resource is earlier than a time domain resource of the first time-frequency resource.

Further, based on the foregoing embodiment, in another implementation of this application, the receiving module 11 is further configured to: before receiving the first downlink control channel that is sent by the network device on the third time-frequency resource, receive indication information sent by the network device; and the processing module 12 is further configured to control the receiving module, based on the indication information, to receive the first downlink control channel.

Optionally, if the indication information includes information about the third time-frequency resource, the processing module 12 may be specifically configured to control the receiving module, based on the indication information, to receive the first downlink control channel on the third time-frequency resource. Optionally, if the indication information includes a time-frequency resource range for receiving the first downlink control channel, and the time-frequency resource range includes the third time-frequency resource, the processing module 12 may be specifically configured to control the receiving module, based on the indication information, to receive the first downlink control channel on a time-frequency resource in the time-frequency resource range. Optionally, if the first terminal device and the network device agree on the third time-frequency resource for sending the first downlink control channel, the processing module 12 may be specifically configured to control the receiving module, based on the indication information, to receive the first downlink control channel on the preset third time-frequency resource.

The terminal device provided in this application may be configured to perform steps performed by the first terminal device in the method embodiment shown in FIG. 3, implementation principles and technical effects thereof are similar, and details are not described herein again.

Figure 12:
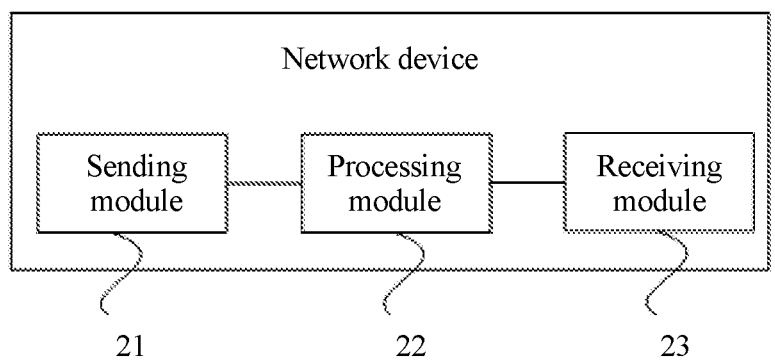
FIG. 12 is a schematic structural diagram of a network device according to this application.

FIG. 12 is a schematic structural diagram of a network device according to this application. As shown in FIG. 12, the network device may include: a sending module 21, a processing module 22, and a receiving module 23.

The sending module 21 is configured to send a first downlink control channel to a first terminal device on a third time-frequency resource, where the first downlink control channel is used to instruct the first terminal device to send a first uplink message to the network device on a first time-frequency resource, transmission directions of the first uplink message and a second downlink message are different, and the second downlink message is a message that is sent by the network device and that the network device schedules, by using a second downlink control channel, a second terminal device to receive on a second time-frequency resource; or the first downlink control channel is used to instruct the first terminal device to receive, on the first time-frequency resource, a first downlink message sent by the network device, transmission directions of the first downlink message and a second uplink message are different, and the second uplink message is a message that the network device schedules, by using the second downlink control channel, the second terminal device to send to the network device on the second time-frequency resource.

The processing module 22 is configured to control the receiving module 23 to receive, on the first time-frequency resource, the first uplink message sent by the first terminal device, and control the sending module 21 not to send the second downlink message to the second terminal device on a same time domain resource that is in the second time-frequency resource and the first time-frequency resource; or control the sending module 21 to send the first downlink message to the first terminal device on the first time-frequency resource, and control the receiving module 23 not to receive, on the same time domain resource that is in the second time-frequency resource and the first time-frequency resource, the second uplink message sent by the second terminal device.

The first time-frequency resource and the second time-frequency resource include a same time domain resource and a same frequency domain resource.

During specific implementation, the sending module 21 may be a transmitter of the network device, the processing module 22 may be a processing component, such as a processor, of the network device, and the receiving module 23 may be a receiver of the network device.

The network device provided in this application may be configured to perform steps performed by the network device in the method embodiment shown in FIG. 1, implementation principles and technical effects thereof are similar, and details are not described herein again.

Optionally, the third time-frequency resource and the second time-frequency resource include a same time domain resource and/or a same frequency domain resource.

Optionally, the first uplink message includes a first uplink data channel, and the first downlink message includes a first downlink data channel.

Optionally, the first uplink message includes a feedback signal of a first downlink data channel; and the first downlink control channel is further used to schedule the first terminal device to receive, on a fourth time-frequency resource, a third downlink message sent by the network device, where the third downlink message includes the first downlink data channel, transmission directions of the third downlink message and the second downlink message are the same, the fourth time-frequency resource and the second time-frequency resource include a same time domain resource and/or a same frequency domain resource, and a time domain resource of the fourth time-frequency resource is earlier than a time domain resource of the first time-frequency resource.

Further, based on the foregoing embodiment, in another implementation of this application, the sending module 21 is further configured to: before sending the first downlink control channel to the first terminal device on the third time-frequency resource, send indication information to the first terminal device, where the indication information is used to indicate, to the first terminal device, whether the network device is to send the first downlink control channel. Optionally, if the first terminal device and the network device agree on the third time-frequency resource for sending the first downlink control channel, the indication information may not need to separately include information about third time-frequency resource. If the first terminal device and the network device do not agree on the third time-frequency resource for sending the first downlink control channel, the indication information may further include information about the third time-frequency resource, or include a time-frequency resource range for receiving the first downlink control channel. The time-frequency resource range may include the third time-frequency resource or the like.

The network device provided in this application may be configured to perform steps performed by the network device in the method embodiment shown in FIG. 3, implementation principles and technical effects thereof are similar, and details are not described herein again.

In addition, this application further provides a terminal device. The terminal device may be a first terminal device, and the first terminal device may include: a receiver, a processor, and a transmitter. During specific implementation, the receiver may be the receiving module 11 shown in FIG. 11, the processor may be the processing module 12 shown in FIG. 11, the transmitter may be the sending module 13 shown in FIG. 11, implementation principles and technical effects thereof are similar, and details are not described herein again.

In addition, this application further provides a network device. The network device may include: a receiver, a processor, and a transmitter. During specific implementation, the receiver may be the receiving module 23 shown in FIG. 12, the processor may be the processing module 22 shown in FIG. 12, the transmitter may be the sending module 21 shown in FIG. 12, implementation principles and technical effects thereof are similar, and details are not described herein again.

What is claimed is:

1. A method, comprising:
   determining, by a network device, according to a first current service corresponding to a first terminal device, according to a second current service corresponding to a second terminal device, and according to a preset mapping relationship between a service and a latency level, that a first latency requirement of the first current service is higher than a second latency requirement of the second current service;
   receiving, by the first terminal device, according to the determination that the first latency requirement is higher than the second latency requirement, a first downlink control channel that is sent by the network device on a third time-frequency resource; and
   after receiving the first downlink control channel:
   sending, by the first terminal device, a first uplink message to the network device on a first time-frequency resource based on the first downlink control channel, wherein transmission directions of the first uplink message and a second downlink message are different, the second downlink message is sent by the network device, and the network device schedules, using a second downlink control channel, the second terminal device to receive the second downlink message on a second time-frequency resource; or receiving, by the first terminal device based on the first downlink control channel and on the first time-frequency resource, a first downlink message sent by the network device, wherein transmission directions of the first downlink message and a second uplink message are different, and the network device schedules, using the second downlink control channel, the second terminal device to send the second uplink message to the network device on the second time-frequency resource;

wherein the first time-frequency resource and the second time-frequency resource comprise a same time domain resource and a same frequency domain resource.

2. The method according to claim 1, wherein the third time-frequency resource and the second time-frequency resource comprise a same time domain resource or a same frequency domain resource.

3. The method according to claim 1, wherein before receiving, by the first terminal device, the first downlink control channel that is sent by the network device on the third time-frequency resource, the method further comprises:

receiving, by the first terminal device, indication information sent by the network device; and determining, by the first terminal device based on the indication information, to receive the first downlink control channel.

4. The method according to claim 1, wherein the first uplink message comprises a first uplink data channel, and the first downlink message comprises a first downlink data channel.

5. The method according to claim 1, wherein:

the first uplink message comprises a feedback signal of a first downlink data channel;

the first downlink control channel is further used to schedule the first terminal device to receive, on a fourth time-frequency resource, a third downlink message sent by the network device; and the third downlink message comprises the first downlink data channel, transmission directions of the third downlink message and the second downlink message are the same, the fourth time-frequency resource and the second time-frequency resource comprise a same time domain resource or a same frequency domain resource, and a time domain resource of the fourth time-frequency resource is earlier than a time domain resource of the first time-frequency resource.

6. A method, comprising:

determining, by a network device, according to a first current service corresponding to a first terminal device, according to a second current service corresponding to a second terminal device, and according to a preset mapping relationship between a service and a latency level, that a first latency requirement of the first current service is higher than a second latency requirement of the second current service;

sending, by the network device, according to the determination that the first latency requirement is higher than the second latency requirement, a first downlink control channel to the first terminal device on a third time-frequency resource, wherein:

the first downlink control channel instructs the first terminal device to send a first uplink message to the network device on a first time-frequency resource, transmission directions of the first uplink message and a second downlink message are different, the second downlink message is sent by the network device, and the network device schedules, using a second downlink control channel, the second terminal device to receive the second downlink message on a second time-frequency resource; or the first downlink control channel instructs the first terminal device to receive, on the first time-frequency resource, a first downlink message sent by the network device, transmission directions of the first downlink message and a second uplink message are different, and the network device schedules, using the second downlink control channel, the second terminal device to send the second uplink message to the network device on the second time-frequency resource; and performing the following:

receiving, by the network device on the first time-frequency resource, the first uplink message sent by the first terminal device, and skipping sending the second downlink message to the second terminal device on a same time domain resource that is comprised in both the second time-frequency resource and the first time-frequency resource; or sending the first downlink message to the first terminal device on the first time-frequency resource, and skipping receiving, on the same time domain resource that is comprised in both the second time-frequency resource and the first time-frequency resource, the second uplink message sent by the second terminal device;

wherein the first time-frequency resource and the second time-frequency resource comprise the same time domain resource and a same frequency domain resource.

7. The method according to claim 6, wherein the third time-frequency resource and the second time-frequency resource comprise a same time domain resource or a same frequency domain resource.

8. The method according to claim 6, wherein before sending, by the network device, the first downlink control channel to the first terminal device on the third time-frequency resource, the method further comprises:

sending, by the network device, indication information to the first terminal device, wherein the indication information indicates, to the first terminal device, whether the network device is to send the first downlink control channel.

9. The method according to claim 6, wherein the first uplink message comprises a first uplink data channel, and the first downlink message comprises a first downlink data channel.

10. The method according to claim 6, wherein:

the first uplink message comprises a feedback signal of a first downlink data channel;

the first downlink control channel is further used to schedule the first terminal device to receive, on a fourth time-frequency resource, a third downlink message sent by the network device; and the third downlink message comprises the first downlink data channel, transmission directions of the third downlink message and the second downlink message are the same, the fourth time-frequency resource and the second time-frequency resource comprise a same time domain resource or a same frequency domain resource, and a time domain resource of the fourth time-frequency resource is earlier than a time domain resource of the first time-frequency resource.

11. A terminal device, wherein the terminal device is configured to implement a first terminal device, and the terminal device comprises:
 a transmitter;
 a receiver; and
 at least one processor, configured to:
  control the receiver to receive, according to a determination that a first latency requirement, of a first current service, corresponding to the first terminal device, is higher than a second latency requirement, of a second current service, corresponding to a second terminal device, a first downlink control channel that is sent by a network device on a third time-frequency resource, wherein the determination that the first latency requirement is higher than the second latency requirement is performed by the network device according to the first current service corresponding to the first terminal device, according to the second current service corresponding to the second terminal device, and according to a preset mapping relationship between a service and a latency level, that the first latency requirement is higher than the second latency requirement;
  control, based on the first downlink control channel, the transmitter to send a first uplink message to the network device on a first time-frequency resource, wherein transmission directions of the first uplink message and a second downlink message are different, the second downlink message is sent by the network device, and the network device schedules, using a second downlink control channel, a second terminal device to receive the second downlink message on a second time-frequency resource; or
  control, based on the first downlink control channel, the receiver to receive, on the first time-frequency resource, a first downlink message sent by the network device, wherein transmission directions of the first downlink message and a second uplink message are different, and the network device schedules, using the second downlink control channel, the second terminal device to send the second uplink message to the network device on the second time-frequency resource;
 wherein the first time-frequency resource and the second time-frequency resource comprise a same time domain resource and a same frequency domain resource.

12. The terminal device according to claim 11, wherein the third time-frequency resource and the second time-frequency resource comprise a same time domain resource or a same frequency domain resource.

13. The terminal device according to claim 11, wherein the receiver is further configured to:
 before receiving the first downlink control channel that is sent by the network device on the third time-frequency resource, receive indication information sent by the network device; and
 wherein the at least one processor is further configured to determine, based on the indication information, to control the receiver to receive the first downlink control channel.

14. The terminal device according to claim 11, wherein the first uplink message comprises a first uplink data channel, and the first downlink message comprises a first downlink data channel.

15. The terminal device according to claim 11, wherein:
 the first uplink message comprises a feedback signal of a first downlink data channel; and
 the first downlink control channel is further used to schedule the first terminal device to receive, on a fourth time-frequency resource, a third downlink message sent by the network device; and
 the third downlink message comprises the first downlink data channel, transmission directions of the third downlink message and the second downlink message are the same, the fourth time-frequency resource and the second time-frequency resource comprise a same time domain resource or a same frequency domain resource, and a time domain resource of the fourth time-frequency resource is earlier than a time domain resource of the first time-frequency resource.

* * * * *